US008314905B2

(12) United States Patent
Kurasawa

(10) Patent No.: US 8,314,905 B2
(45) Date of Patent: Nov. 20, 2012

(54) TRANSFLECTIVE LIQUID CRYSTAL DISPLAY PANEL AND ELECTRONIC APPARATUS

(75) Inventor: Hayato Kurasawa, Matsumoto (JP)

(73) Assignee: Sony Corporation, Tokyo (JP)

( * ) Notice: Subject to any disclaimer, the term of this patent is extended or adjusted under 35 U.S.C. 154(b) by 783 days.

(21) Appl. No.: 12/211,499

(22) Filed: Sep. 16, 2008

(65) Prior Publication Data

US 2009/0079915 A1  Mar. 26, 2009

(30) Foreign Application Priority Data

Sep. 20, 2007  (JP) ................. 2007-243429
Jun. 4, 2008  (JP) ................. 2008-146666

(51) Int. Cl.
*G02F 1/1335* (2006.01)
(52) U.S. Cl. .................. 349/114; 349/106
(58) Field of Classification Search .......... 349/110, 349/111, 113, 114, 106
See application file for complete search history.

(56) References Cited

U.S. PATENT DOCUMENTS

| | | | | |
|---|---|---|---|---|
| 2001/0026347 A1* | 10/2001 | Sawasaki et al. | ............. | 349/156 |
| 2007/0211202 A1* | 9/2007 | Ishii et al. | ............. | 349/153 |
| 2007/0263148 A1* | 11/2007 | Teramoto et al. | ............. | 349/117 |

FOREIGN PATENT DOCUMENTS

| | | |
|---|---|---|
| JP | A 2002-14363 | 1/2002 |
| JP | A 2002-182230 | 6/2002 |
| JP | A 2002-244158 | 8/2002 |
| JP | A 2003-344837 | 12/2003 |
| JP | A 2006-337625 | 12/2006 |

* cited by examiner

*Primary Examiner* — Mark Robinson
*Assistant Examiner* — Paul Lee
(74) *Attorney, Agent, or Firm* — K&L Gates LLP

(57) ABSTRACT

The invention provides, as an aspect thereof, a transflective liquid crystal display panel that includes: a first substrate that has a plurality of pixel areas, each of the plurality of pixel areas having a transmissive area and a reflective area; and a second substrate that is provided opposite to the first substrate with a liquid crystal layer being sandwiched therebetween. In the configuration of a transflective liquid crystal display panel according to this aspect of the invention, the second substrate has (1) a color filter that corresponds to a plurality of color components, the color filter that corresponds to the plurality of color components having such an array pattern that corresponds to the plurality of pixel areas, (2) a phase difference layer that is formed on the liquid-crystal-layer-side face of the second substrate so as to correspond to the reflective area, and (3) a member that lowers a light transmission factor, the light-transmission-factor reduction member being formed at a region that at least overlaps, when viewed in plan, the side portion of the phase difference layer.

10 Claims, 15 Drawing Sheets

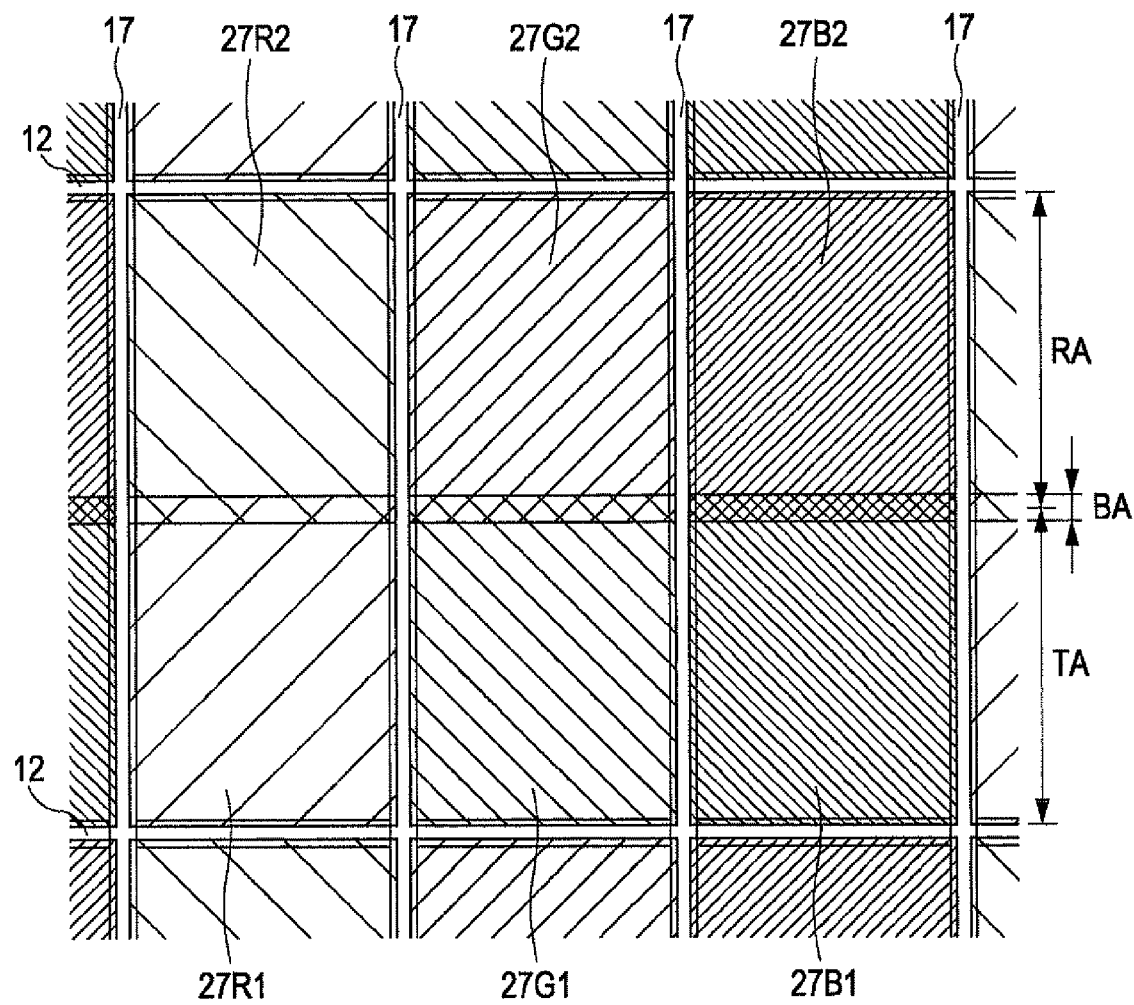

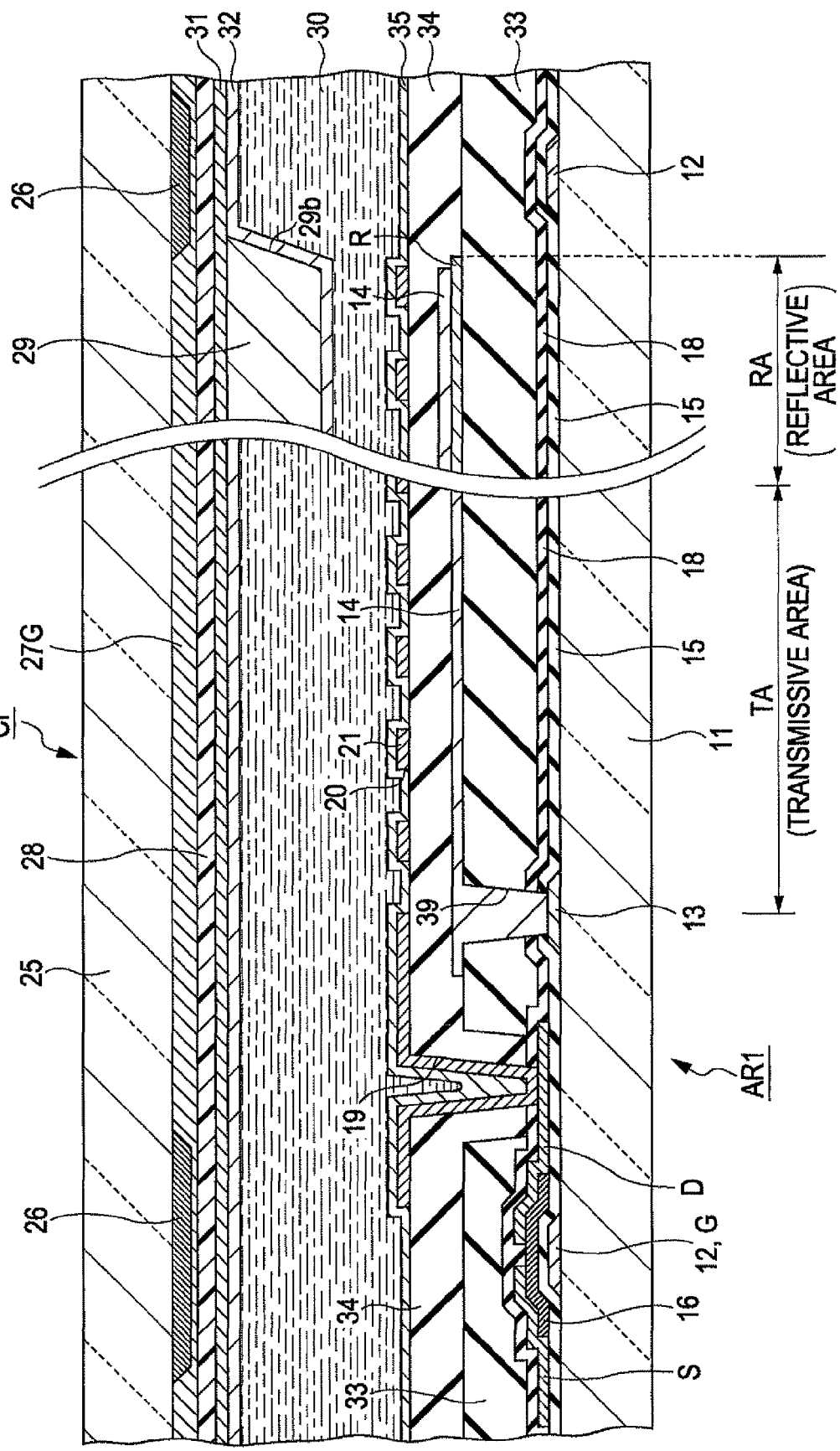

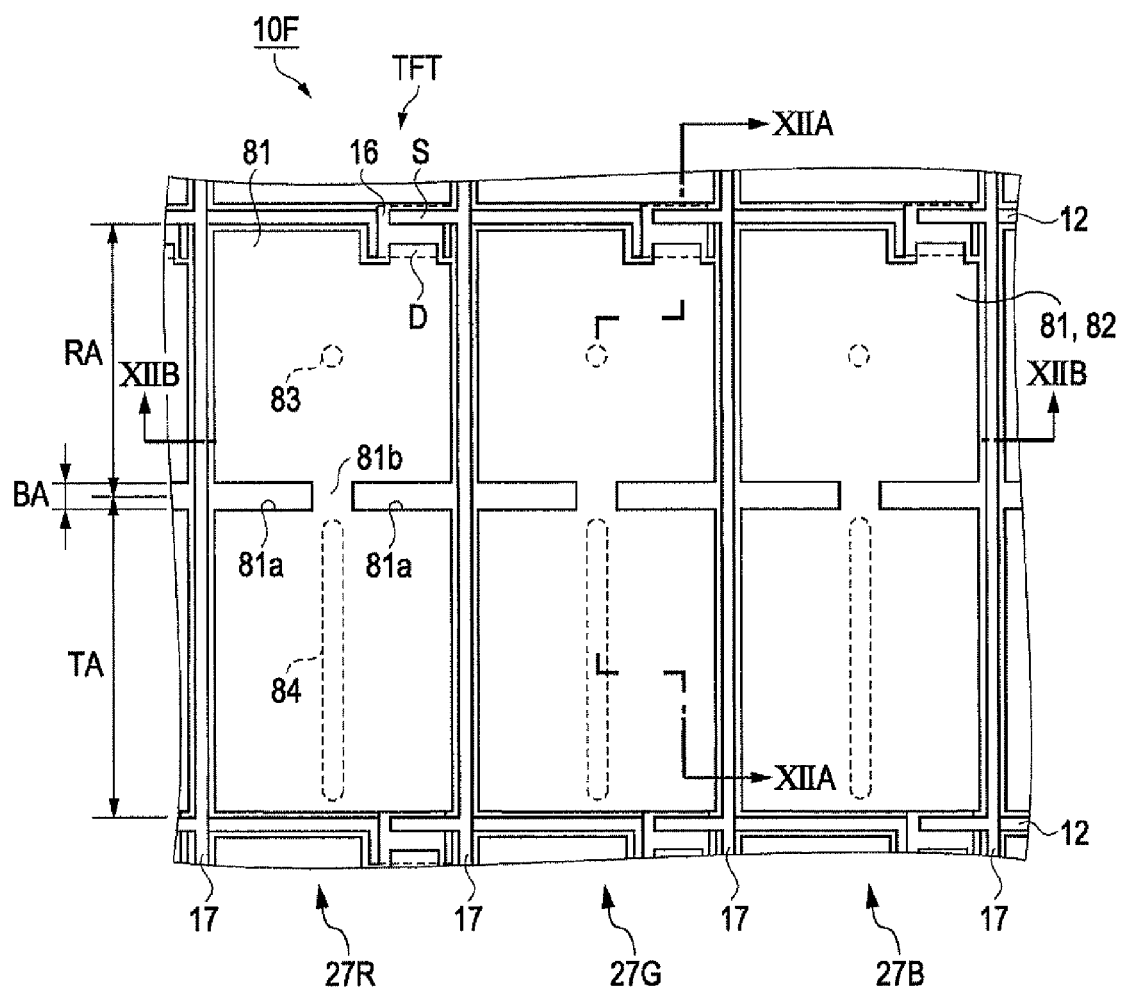

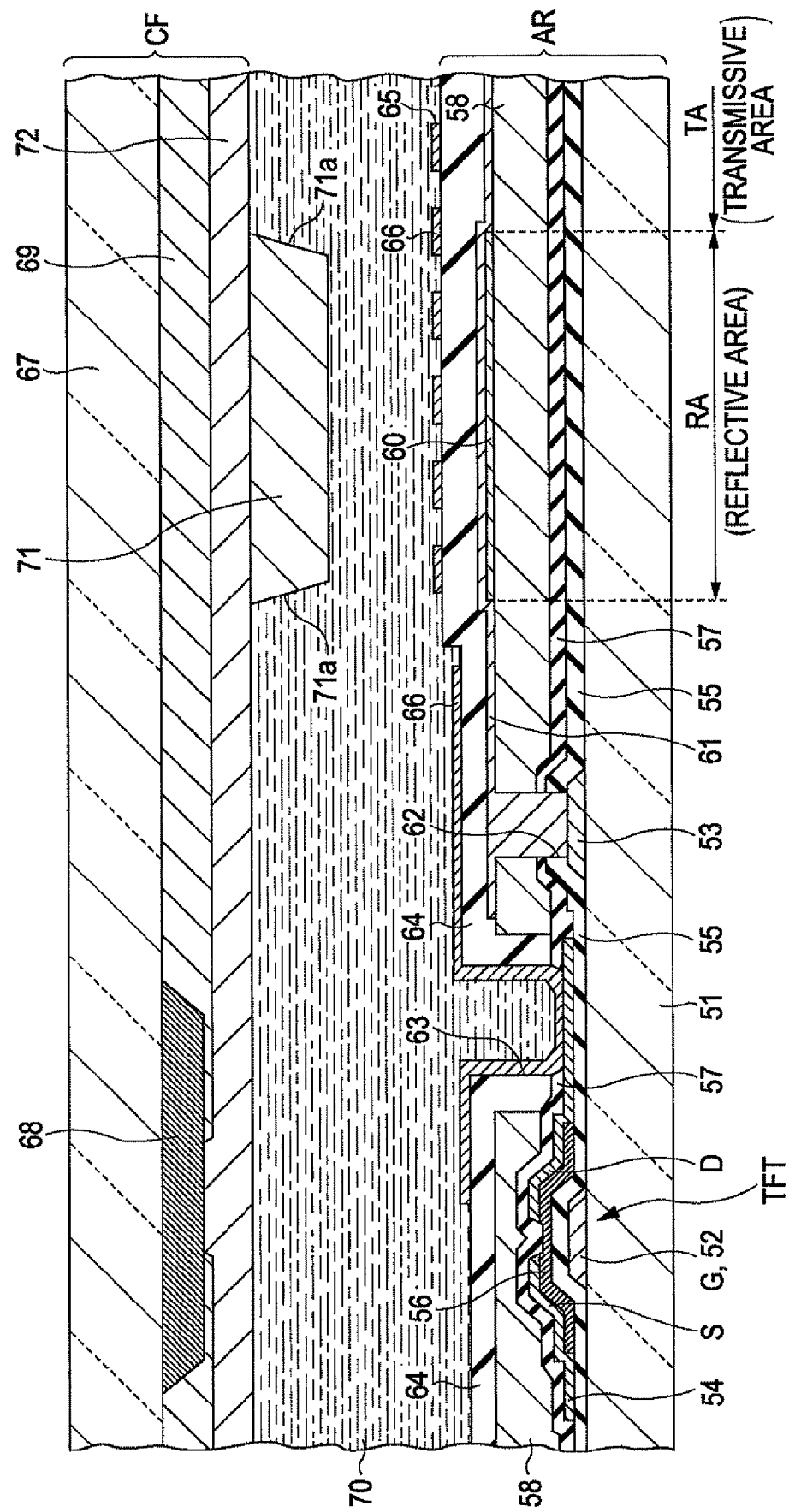

TRANSFLECTIVE LIQUID CRYSTAL
DISPLAY PANEL AND ELECTRONIC
APPARATUS

BACKGROUND

1. Technical Field

The present invention relates to a transflective liquid crystal display panel. The invention further relates to an electronic apparatus that is provided with a transflective liquid crystal display panel.

2. Related Art

Recently, a transflective liquid crystal display panel has been developed actively. A transflective liquid crystal display panel has combined features of a transmissive liquid crystal display panel and a reflective liquid crystal display panel. A transflective liquid crystal display panel has a transmissive area (i.e., transmissive region) and a reflective area in each pixel area. The transmissive region has a pixel electrode. The reflective region has a pixel electrode and a reflector (i.e., reflecting plate). Under low light conditions, internal light is used for image display. That is, under such conditions, a backlight emits light, which passes through the transmissive area. On the other hand, in a well-lighted area, an image is displayed without turning the backlight ON. That is, under such conditions, external light that is reflected at the reflective area is used for image display.

In the technical field to which the present invention pertains, so-called vertical electric-field liquid crystal display panels are widely used as the mainstream electric-field mode thereof. In the configuration of a vertical electric-field liquid crystal display panel, an electrode(s) is formed on each of a pair of substrates. A few examples of such a vertical electric-field liquid crystal display panel are a TN (Twisted Nematic) liquid crystal display panel and a VA (Vertical Alignment) liquid crystal display panel. Although vertical electric-field liquid crystal display panels are predominantly used, horizontal electric-field liquid crystal display panels are also used in the related art. In the configuration of a horizontal electric-field liquid crystal display panel, electrodes are formed on only one of a pair of substrates. A few examples of such a horizontal electric-field liquid crystal display panel are an FFS (Fringe Field Switching) liquid crystal display panel and an IPS (In-Plane Switching) liquid crystal display panel, which are described in, for example, JP-A-2002-14363 and JP-A-2002-244158.

A transflective liquid crystal display panel has recently been developed also in the field of an FFS liquid crystal display device (refer to JP-A-2003-344837 and JP-A-2006-337625). With reference to FIGS. 14 and 15, an FFS transflective liquid crystal display panel of the related art is explained below. It should be noted that, in the accompanying drawings that will be mentioned in the following description of this specification, different scales are used for layers/members illustrated therein so that each of the layers/members has a size that is easily recognizable therein. Therefore, the dimensions of constituent elements that are shown in the accompanying drawings do not necessarily reflect, in proportion thereto, those that will be adopted in an actual implementation of the invention.

FIG. 14 is a plan view that schematically illustrates an example of the pixel configuration of an FFS transflective liquid crystal display panel of the related art; more specifically, FIG. 14 shows one pixel of an FFS transflective liquid crystal display panel of the related art. FIG. 15 is a sectional view taken along the line XV-XV of FIG. 14.

As shown in FIGS. 14 and 15, an FFS transflective liquid crystal display panel of the related art (50) is provided with an array substrate AR and a color filter substrate CF. The array substrate AR of the related-art FFS transflective liquid crystal display panel 50 has the following layer structure. A plurality of scanning lines 52 and a plurality of common lines 53 are formed on the surface of a first transparent substrate 51. The scanning line 52 and the common line 53 extend in parallel with each other. A plurality of signal lines 54 is formed over the array substrate AR. The plurality of signal lines 54 extends in a direction perpendicular to, or at least intersecting with, the plurality of scanning lines 52 and the plurality of common lines 53 when viewed in plan. A gate insulation film 55 covers the surface of the scanning line 52 and the common line 53. The gate insulation film 55 is made of a transparent insulation material. The signal line 54 is formed on the surface of the gate insulation film 55. A semiconductor layer 56 is formed on the surface of the gate insulation film 55. The semiconductor layer 56 is formed in such a manner that it overlaps, when viewed in plan, a portion of the scanning line 52 that functions as a gate electrode G with the gate insulation film 55 being sandwiched therebetween. A source electrode S extends from the signal line 54 so as to partially overlie the semiconductor layer 56. A drain electrode D also partially overlies the semiconductor layer 56. The gate electrode G, the source electrode S, and the drain electrode D make up a TFT (Thin Film Transistor). A protective insulation film 57 is formed over these lines, electrodes, and films (i.e., layers) explained above so as to cover the entire surface over the first transparent substrate 51.

An inter-bedded film, or, in other words, an interlayer film 58 covers the surface of the protective insulation film 57. The inter-bedded film 58 has surface roughness (which is not shown in the drawing) in the reflective area RA of each pixel. The surface of the inter-bedded film 58 is smooth for other area thereof. A reflecting plate 60 is formed at the reflective area RA of each pixel on the inter-bedded film 58. The reflecting plate 60 is made of aluminum or aluminum alloy. A lower electrode 61 is formed on the surface of the inter-bedded film 58 for each pixel. A part of the lower electrode 61 overlies the reflecting plate 60. The lower electrode 61 is made of a transparent electro-conductive material such as ITO (Indium Tin Oxide), IZO (Indium Zinc oxide), or the like. A contact hole 62 is formed through the protective insulation film 57 and the gate insulation film 55 so as to expose the surface of the common line 53. The lower electrode 61 is electrically connected to the common line 53 via the contact hole 62. A contact hole 63 is formed through the inter-bedded film 58 and the protective insulation film 57 so as to expose the surface of the drain electrode D of the TFT. The area at which the lower electrode 61 is formed includes the reflective area RA and a transmissive area TA. A partial area of the entire lower-electrode formation area at which the reflecting plate 60 is formed corresponds to the reflective area RA. The remaining area thereof at which the reflecting plate 60 is not formed corresponds to the transmissive area TA.

A capacitor insulation film 64 is formed on the surface of the lower electrode 61 and on/over the surface of the inter-bedded film 58. The capacitor insulation film 64 is made of a transparent insulation material such as silicon nitride or silicon oxide. The capacitor insulation film 64 covers the inner-wall surface of the contact hole 63 in such a manner that the drain electrode D of the TFT is exposed at the open bottom of the contact hole 63. An upper electrode 66 is formed on the surface of the capacitor insulation film 64 for each pixel. The upper electrode 66 is made of a transparent electro-conductive material such as ITO (Indium Tin Oxide), IZO (Indium zinc Oxide), or the like. The upper electrode 66 has a plurality of slits 65. The plurality of slits 65 formed in the upper electrode 66 extends in parallel with one another. Each end portion of each of these slits 65 is closed. The upper electrode 66 is electrically connected to the drain electrode D through the contact hole 63. An alignment film (i.e., orientation film) covers the surface of the upper electrode 66 and the plurality of slits 65 formed therein. Note that the alignment film is not illustrated in the drawing.

The color filter substrate CF of the related-art FFS transflective liquid crystal display panel 50 has the following layer structure. A light-shielding layer 68 and a color filter layer 69 are formed on the surface of a second transparent substrate 67. In addition, a planarizing film, that is, planarization film 72 is formed over (i.e., not directly on) the surface of the second transparent substrate 67. The planarizing film 72 covers both the surface of the light-shielding layer 68 and the surface of the color filter layer 69. A phase difference layer 71 is formed on the surface of the planarizing film 72 at an area corresponding to the reflective area RA. An alignment film that is not shown in the drawing is formed on the surfaces of the phase difference layer 71 and the planarizing film 72. The array substrate AR and the color filter substrate CF are set opposite to each other with a certain space left therebetween. Specifically, the array substrate AR and the color filter substrate CF are positioned opposite to each other in such a manner that the upper electrode 66 and the color filter layer 69 face each other. Then, liquid crystal 70 is injected into the space in such a manner that it is sealed between the array substrate AR and the color filter substrate CF. The related-art FFS transflective liquid crystal display panel 50 has the layer structure explained above.

When the related-art FFS transflective liquid crystal display panel 50 performs reflective display with the use of the reflective area RA, external light is reflected at the reflecting plate 60. Specifically, at the time of reflective image display, external light enters the panel 50 as an incident light beam and then gets reflected by the reflecting plate 60. Then, the reflected light goes out through the display surface thereof. This means that external light passes through the liquid crystal layer twice at the time of reflective image display. For the purpose of adjusting a phase difference that arises between the transmissive display in which an image is displayed as a result of optical transmission at the transmissive area TA and the reflective display in which an image is displayed as a result of optical reflection at the reflective area RA, the related-art FFS transflective liquid crystal display panel 50 is provided with a phase difference layer 71.

Specifically, the film thickness of the phase difference layer 71 is adjusted in such a manner that the retardation (i.e., phase difference) of the liquid crystal 70 at the reflective area RA equals to a quarter (¼) wavelength under the condition that the retardation of the liquid crystal 70 at the transmissive area TA equals to a half (½) wavelength. The retardation of the phase difference layer 71 is a half (½) wavelength. With the film-thickness adjustment explained above, the retardation for non-external light that passes through the transmissive area TA, which is a half wavelength, becomes equal to the retardation for external light that enters the panel 50 as an incident light beam and then gets reflected at the reflective area RA, which is also a half wavelength. Therefore, regardless of whether the transmissive area TA is used for image display (i.e., transmissive display) or the reflective area RA is used for image display (i.e., reflective display), it is possible to achieve excellent display performance.

The phase difference layer 71 of the related-art FFS transflective liquid crystal display panel 50 is typically formed by means of a photolithographic method, though not limited thereto. Therefore, the finished form of each of the side faces 71a of the phase difference layer 71 depends on, or, in other words, is influenced by, formation precision in the patterning process. For this reason, each of the finished side faces 71a of the phase difference layer 71 is not necessarily perpendicular to the formation surface thereof. That is, as illustrated in FIG. 15, each of the side faces 71a of the phase difference layer 71 could be inclined with respect to the formation surface thereof. In the following description, such a slanted structure of each of the side faces 71a of the phase difference layer 71 is referred to as "tapered" structure. The term "tapered" might have special connotation and/or meaning in this specification, the definition of which might differ from their customary meaning. When the side faces 71a of the phase difference layer 71 are tapered, a film thickness value measured at the side-face portion thereof deviates from a non-tapered film thickness value. As a result thereof, a phase difference value measured at the side-face portion thereof deviates from a non-tapered phase difference value. That is, if so tapered, it is not possible to obtain a desired phase difference value. Consequently, optical leakage occurs near the border between the transmissive area TA and the reflective area RA, which results in degradation in image display performance. Such degradation in image display performance is not unique to horizontal electric-field liquid crystal display panels. That is, the same problem arises for vertical electric-field liquid crystal display panels.

SUMMARY

In order to address the above-identified problems without any limitation thereto, the invention provides, as various aspects thereof, a transflective liquid crystal display panel and an electronic apparatus having the following novel and inventive features, the non-limiting exemplary configuration and operation of which will be described in detail below in DESCRIPTION OF EXEMPLARY EMBODIMENTS.

APPLICATION EXAMPLE 1

(First Aspect):

A transflective liquid crystal display panel, comprising: a first substrate that has a plurality of pixel areas, each of the plurality of pixel areas having a transmissive area and a reflective area; and a second substrate that is provided opposite to the first substrate with a liquid crystal layer being sandwiched therebetween, the second substrate having a color filter that corresponds to a plurality of color components, the color filter that corresponds to the plurality of color components having such an array pattern that corresponds to the plurality of pixel areas, a phase difference layer that is formed on the liquid-crystal-layer-side face of the second substrate so as to correspond to the reflective area, and a member that lowers a light transmission factor, the light-transmission-factor reduction member being formed at a region that at least overlaps, when viewed in plan, the side portion of the phase difference layer.

Generally speaking, it is difficult to adjust the film thickness of each side portion of the phase difference layer. For this reason, it is difficult to adjust retardation (i.e., phase difference) at each side portion of the phase difference layer. In the configuration of a transflective liquid crystal display panel according to the first aspect of the invention described above, a member that lowers a light transmission factor (hereafter referred to as "light-transmission-factor reduction member") is formed on the second substrate. The light-transmissionfactor reduction member is formed at a region that at least overlaps, when viewed in plan, the side portion of the phase difference layer. With such a structure, even when a retardation value measured at the side portion of the phase difference layer deviates from a designed value due to some aberration therein because of a difficulty in the adjustment thereof at the side portions of the phase difference layer, which causes some optical failure such as the leakage of light or the like, it is not perceived at all or substantially less perceivable on the display thanks to the presence of the light-transmission-factor reduction member. In other words, if the configuration of a transflective liquid crystal display panel according to the first aspect of the invention described above is adopted, it is possible to make such an optical failure unnoticeable or substantially less noticeable and thus to avoid any degradation in image display performance, which is attributable to some aberration/deviation in retardation at the side portion of the phase difference layer.

APPLICATION EXAMPLE 2

In the configuration of a transflective liquid crystal display panel according to the first aspect of the invention described above, it is preferable that the light-transmission-factor reduction member should be, among a plurality of color filter layers that make up the above-mentioned color filter, any color filter layer other than one that transmits a beam of light of one color component whose visibility factor is the highest.

With such a preferred configuration, it is possible to provide the light-transmission-factor reduction member while utilizing the structure of the color filter that corresponds to a plurality of color components. That is, it is not necessary to provide any other additional member for the purpose of lowering a light transmission factor at a region that at least overlaps, when viewed in plan, the side portion of the phase difference layer.

APPLICATION EXAMPLE 3

In the preferred configuration of a transflective liquid crystal display panel explained above, it is further preferable that a portion of other color filter layer should be formed at a region that overlaps, when viewed in plan, the side portion of the phase difference layer in the highest-visibility pixel area at which the above-mentioned one color filter layer that transmits a beam of light of the above-mentioned one color component whose visibility factor is the highest is formed in such a manner that the portion of the above-mentioned other color filter layer overlies the above-mentioned one color filter layer that transmits a beam of light of the above-mentioned one color component whose visibility factor is the highest.

In the preferred configuration of a transflective liquid crystal display panel explained above, a portion of other color filter layer is formed at a region that overlaps, when viewed in plan, the side portion of the phase difference layer in the highest-visibility pixel area at which the above-mentioned one color filter layer that transmits a beam of light of the above-mentioned one color component whose visibility factor is the highest is formed. In addition, the portion of the above-mentioned other color filter layer overlies the above-mentioned one color filter layer that transmits a beam of light of the above-mentioned one color component whose visibility factor is the highest. Such an overlying color-filter structure of more than one color component functions as the light-transmission-factor reduction member. It should be noted that degradation in image display performance is most conspicuous in the highest-visibility pixel area at which the above-mentioned one color filter layer that transmits a beam of light of the above-mentioned one color component whose visibility factor is the highest is formed. In this respect, in the preferred configuration of a transflective liquid crystal display panel explained above, the light-transmission-factor reduction member is formed at a region that overlaps, when viewed in plan, the side portion of the phase difference layer at which it is difficult to adjust retardation in the highest-visibility pixel area. With such a preferred structure, it is possible to effectively avoid degradation in image display performance, which is attributable to a difficulty in the adjustment of retardation thereat. In other words, it is possible to provide a transflective liquid crystal display panel that is capable of displaying an image in high quality with a simple structure.

APPLICATION EXAMPLE 4

In the configuration of a transflective liquid crystal display panel according to the first aspect of the invention described above, it is preferable that the second substrate should further have a light shielding layer that demarcates the pixel areas when viewed in plan; and the light-transmission-factor reduction member should be the light shielding layer.

With such a preferred configuration, the light-shielding layer completely shuts off light that leaks at the side portion of the phase difference layer. Thus, if the preferred configuration of a transflective liquid crystal display panel described above is adopted, it is possible to avoid, either perfectly or almost perfectly, degradation in image display performance, which is attributable to a difficulty in the adjustment of retardation at the side portion of the phase difference layer.

APPLICATION EXAMPLE 5

In the configuration of a transflective liquid crystal display panel according to the first aspect of the invention described above, it is preferable that the color filter should be made up of, in each of the plurality of pixel areas, a transmissive-area-side color filter layer that is formed in the transmissive area thereof and a reflective-area-side color filter layer that is formed in the reflective area thereof; the reflective-area-side color filter layer should have the same color component as that of the transmissive-area-side color filter layer but have lesser color density than that of the transmissive-area-side color filter layer; and the light-transmission-factor reduction member should be the overlapping structure of the transmissive-area-side color filter layer and the reflective-area-side color filter layer.

In the preferred configuration of a transflective liquid crystal display panel explained above, the reflective-area-side color filter layer that has the same color component as that of the transmissive-area-side color filter layer but has lesser color density than that of the transmissive-area-side color filter layer is formed in the reflective area as a layer component of the second substrate. With such a preferred configuration, it is possible to display a reflective image with increased brightness. In addition, it is possible to provide a transflective liquid crystal display panel that is capable of effectively avoiding degradation in image display performance, which is attributable to a difficulty in the adjustment of retardation at the side portion of the phase difference layer.

APPLICATION EXAMPLE 6

In the configuration of a transflective liquid crystal display panel according to the first aspect of the invention described above, it is preferable that the film thickness of the phase difference layer should be adjusted in such a manner that the relationship between the thickness L1 of the liquid crystal layer at the transmissive area and the thickness L2 of the liquid crystal layer at the reflective area satisfies the following mathematical formula.

$$L2=(\tfrac{1}{2})L1$$

In the preferred configuration of a transflective liquid crystal display panel explained above, the thickness of the liquid crystal layer is adjusted through the adjustment of the film thickness of the phase difference layer in such a manner that the thickness L2 of the liquid crystal layer at the reflective area is a half (½) of the thickness L1 of the liquid crystal layer at the transmissive area. Therefore, it is not necessary to form any other additional layer such as a transparent resin layer for the purpose of adjusting the thickness of the liquid crystal layer. Since the thickness L2 of the liquid crystal layer at the reflective area is set to be a half of the thickness L1 of the liquid crystal layer at the transmissive area, the distance of a transmissive optical path along which a beam of light travels at the transmissive area through the liquid crystal layer is made equal to the distance of a reflective optical path along which a beam of light travels at the reflective area through the liquid crystal layer. With the film-thickness adjustment explained above, the retardation for non-external light that passes through the transmissive area becomes equal to the retardation for external light that enters the transflective liquid crystal display panel as an incident light beam and then gets reflected at the reflective area. Therefore, regardless of whether the transmissive area is used for image display (i.e., transmissive display) or the reflective area is used for image display (i.e., reflective display), it is possible to achieve optimum image display.

APPLICATION EXAMPLE 7

In the configuration of a transflective liquid crystal display panel according to the first aspect of the invention described above, it is preferable that the first substrate should have, in each of the plurality of pixel areas, a first electrode and a second electrode each of which is formed across the border between the transmissive area and the reflective area; and the liquid crystal layer should be driven by a horizontal electric field that is generated between the first electrode and the second electrode.

In the preferred configuration of a transflective liquid crystal display panel explained above, the liquid crystal layer is driven by a horizontal electric field that is generated between the first electrode and the second electrode. Therefore, regardless of whether the transmissive area is used for image display (i.e., transmissive display) or the reflective area is used for image display (i.e., reflective display), it is possible to achieve excellent display performance with a wide viewing angle.

APPLICATION EXAMPLE 8

(Second Aspect): An electronic apparatus that is provided with the transflective liquid crystal display panel according to the first aspect of the invention described above.

Since an electronic apparatus according to the second aspect of the invention is provided with the transflective liquid crystal display panel according to the first aspect of the invention described above, it is possible to achieve excellent display performance regardless of whether the transmissive area is used for image display or the reflective area is used for image display, that is regardless of whether transmissive display is performed or reflective display is performed. A non-limiting example of a variety of electronic apparatuses according to the second aspect of the invention is a handheld information terminal (i.e., device) such as a mobile phone, which is to be used outdoors.

BRIEF DESCRIPTION OF THE DRAWINGS

The invention will be described with reference to the accompanying drawings, wherein like numbers reference like elements.

FIG. 1 shows three pixels of an FFS transflective liquid crystal display panel according to the first exemplary embodiment of the invention whereas a color filter substrate thereof is omitted from FIG. 1.

FIG. 9 is a plan view that schematically illustrates an example of the configuration of a set of color filter layers of an FFS transflective liquid crystal display panel according to the fourth exemplary embodiment of the invention.

FIG. 10 is a sectional view that schematically illustrates a variation example of the layer/lamination structure of an FFS transflective liquid crystal display panel according to any of the first, second, third, and fourth exemplary embodiments of the invention, which corresponds to the layer/lamination structure of an FFS transflective liquid crystal display panel according to the first exemplary embodiment of the invention, which is shown in FIG. 2.

FIG. 11 is a plan view that schematically illustrates an example of the pixel area of a vertical electric-field transflective liquid crystal display panel according to a fifth exemplary embodiment of the invention; more specifically, FIG. 11 shows three pixels of a vertical electric-field transflective liquid crystal display panel according to the fifth exemplary embodiment of the invention whereas a color filter substrate thereof is omitted from FIG. 11.

FIG. 12 is a set of sectional views that schematically illustrates an example of the layer/lamination structure of a vertical electric-field transflective liquid crystal display panel according to the fifth exemplary embodiment of the invention; more specifically.

FIG. 14 shows one pixel of an FFS transflective liquid crystal display panel of the related art.

FIG. 15 is a sectional view taken along the line XV-XV of FIG. 14.

DESCRIPTION OF EXEMPLARY EMBODIMENTS

With reference to the accompanying drawings, exemplary embodiments of the invention, including its best mode, are explained below. In the following description of each of exemplary embodiments of the invention (except for the fifth embodiment thereof), an FFS transflective liquid crystal display panel is taken as an example of a transflective liquid crystal display panel according to an aspect of the invention. In addition, an FFS transflective liquid crystal display panel will be explained later as an image-display component of an electronic apparatus according to an aspect of the invention. However, the present invention should be in no case interpreted to be limited to the specific embodiments described herein. The invention may be modified, altered, changed, adapted, and/or improved within a range not departing from the gist and/or spirit of the invention apprehended by a person skilled in the art from explicit and implicit description given herein as well as appended claims. Needless to say, a transflective liquid crystal display panel according to an aspect of the invention and an electronic apparatus that is provided with a transflective liquid crystal display panel according to an aspect of the invention that are subjected to such a modification, alteration, change, adaptation, and/or improvement are also within the technical scope of the invention. For example, the invention is applicable to other horizontal electric-field transflective liquid crystal display panels such as an IPS transflective liquid crystal display panel, without any limitation thereto. Or, the invention may be applied to vertical electric-field transflective liquid crystal display panels that includes but not limited to a TN transflective liquid crystal display panel or a VA transflective liquid crystal display panel (a non-limiting example of which is described in the fifth embodiment thereof).

Figure 1:
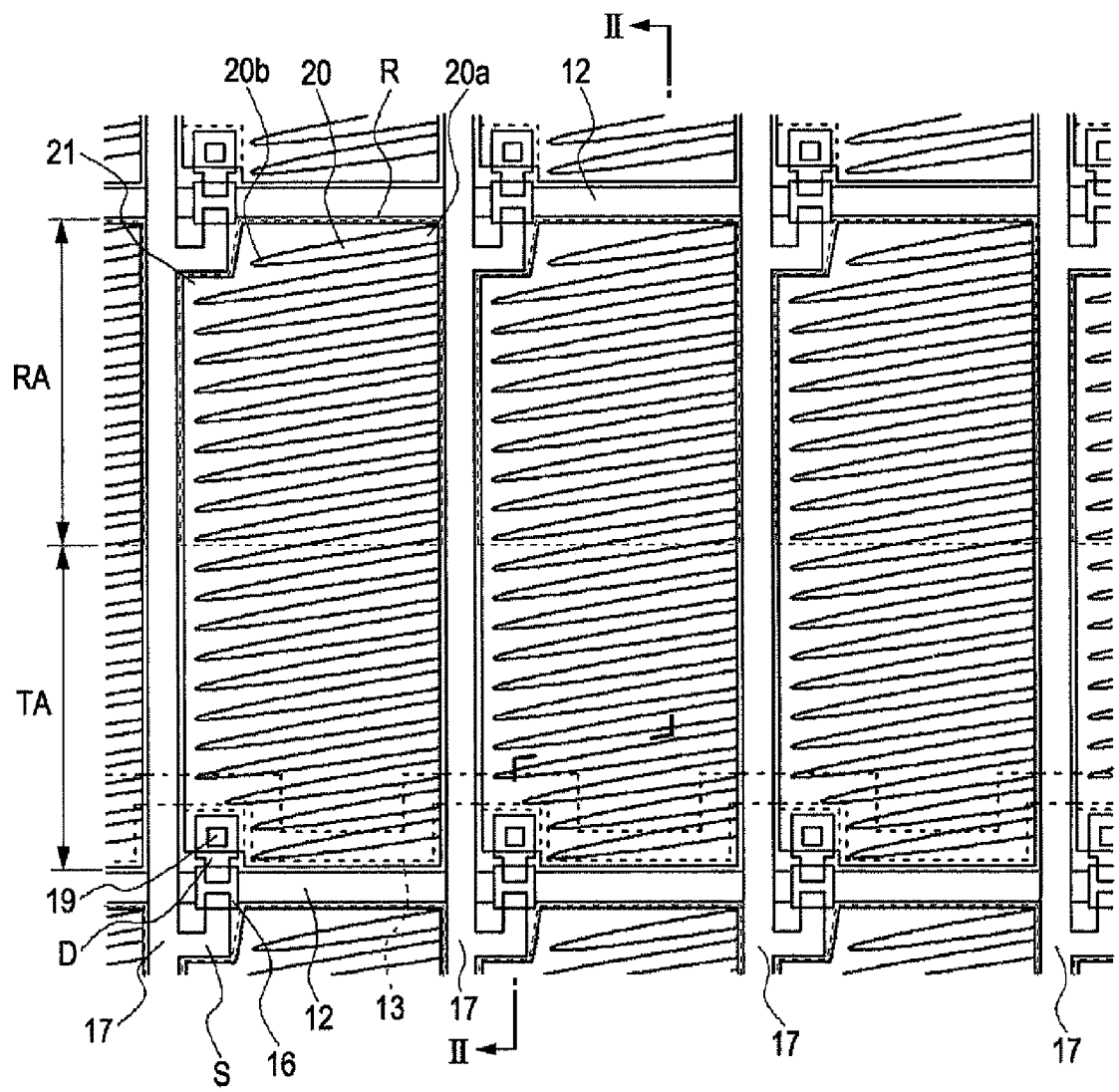
FIG. 1 is a plan view that schematically illustrates an example of the pixel configuration of an FFS (horizontal electric-field) transflective liquid crystal display panel according to a first exemplary embodiment of the invention; more specifically.
Figure 2:
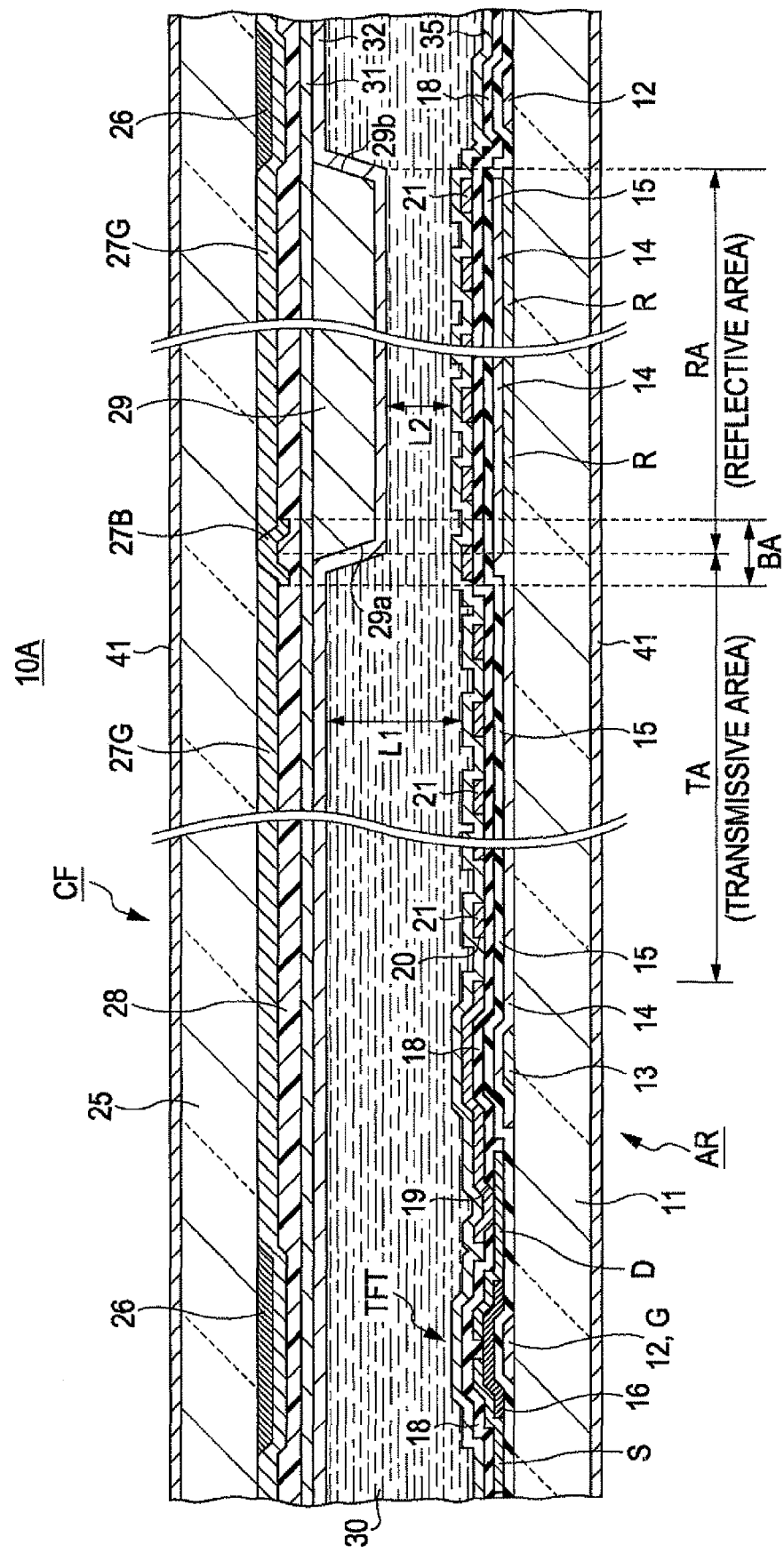
FIG. 2 is a sectional view taken along the line II-II of FIG. 1.
Figure 3:
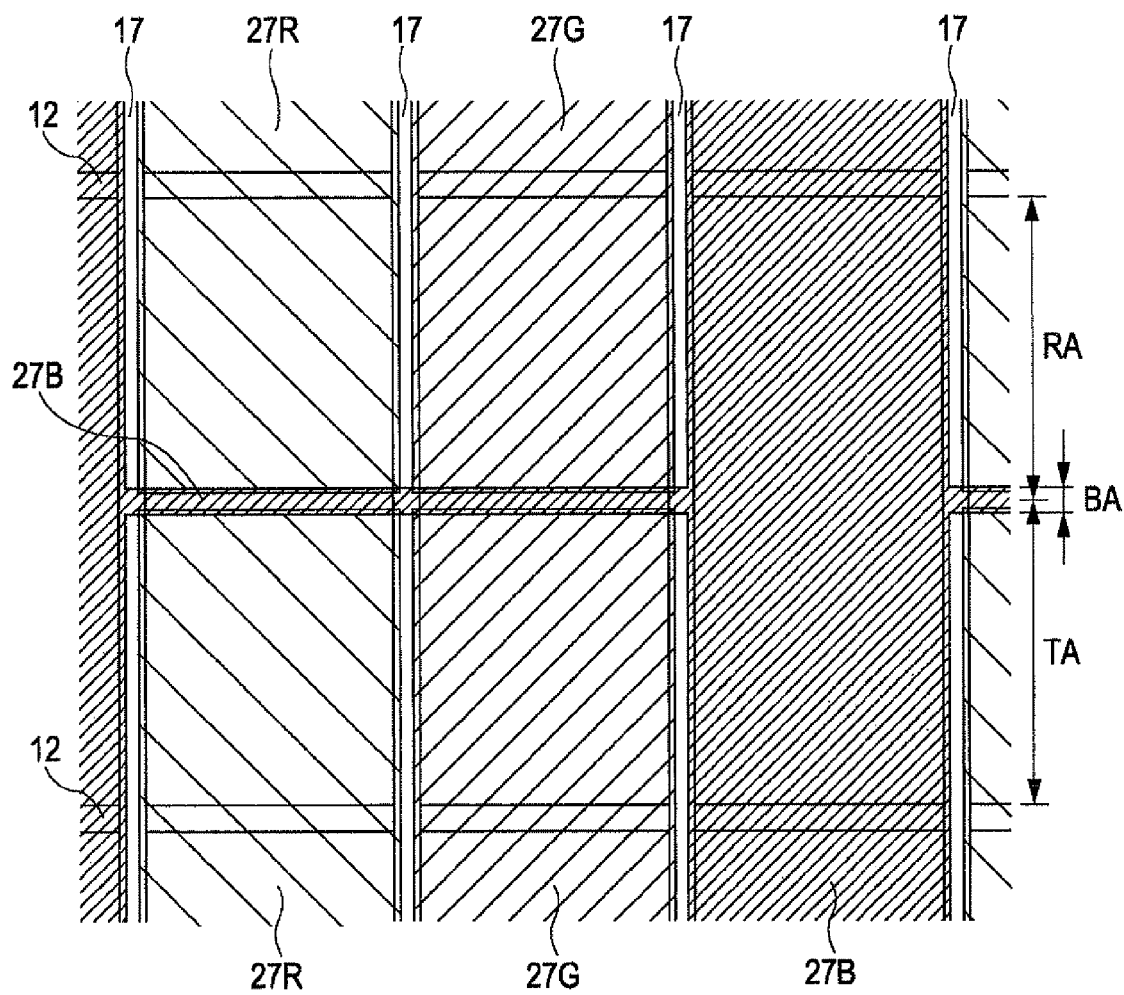
FIG. 3 is a plan view that schematically illustrates an example of the configuration of a set of color filter layers of an FFS transflective liquid crystal display panel according to the first exemplary embodiment of the invention.
Figure 4:
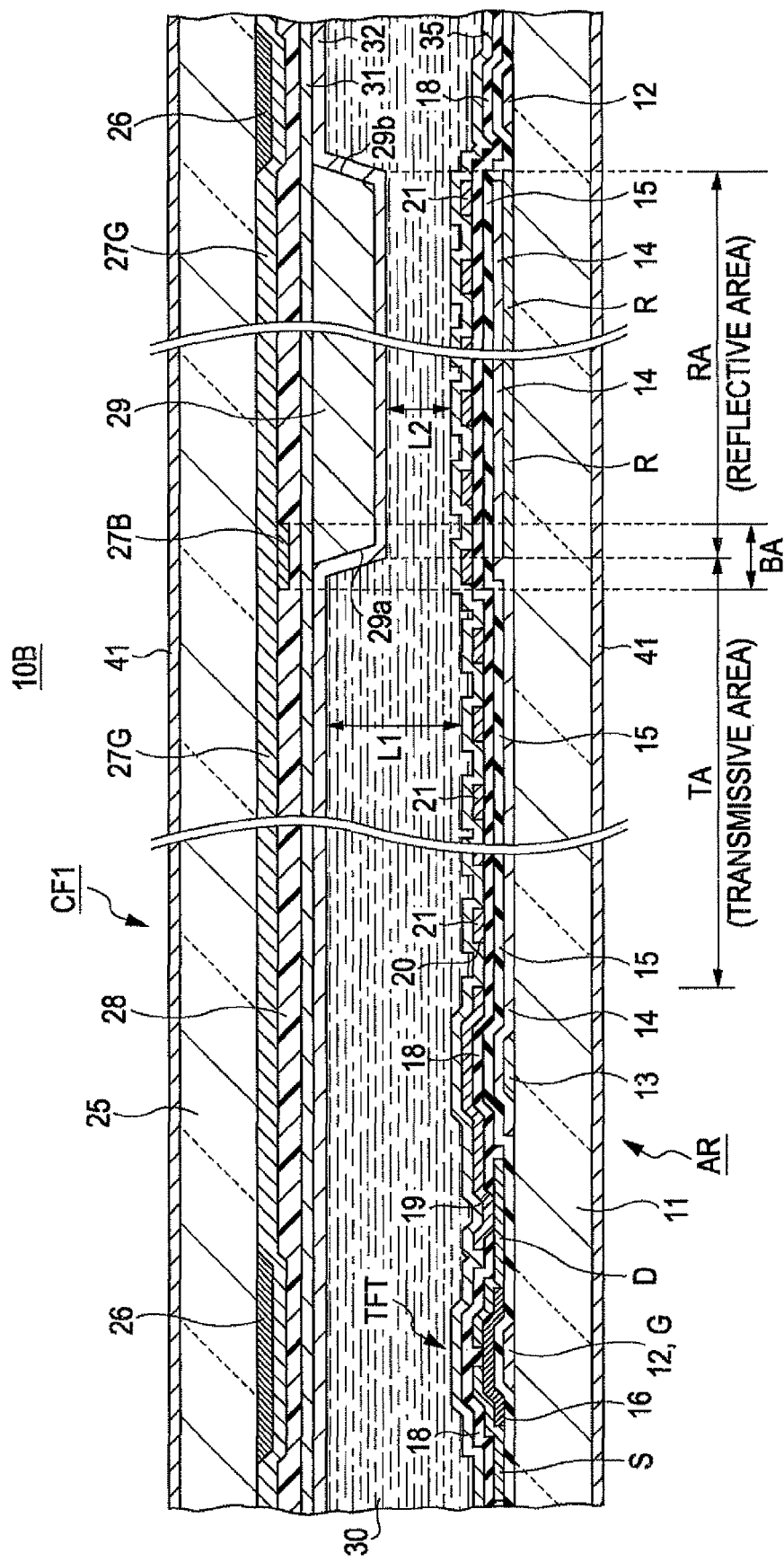
FIG. 4 is a sectional view that schematically illustrates an example of the layer/lamination structure of an FFS transflective liquid crystal display panel according to a second exemplary embodiment of the invention, which corresponds to the layer/lamination structure of an FFS transflective liquid crystal display panel according to the first exemplary embodiment of the invention, which is shown in FIG. 2.
Figure 5:
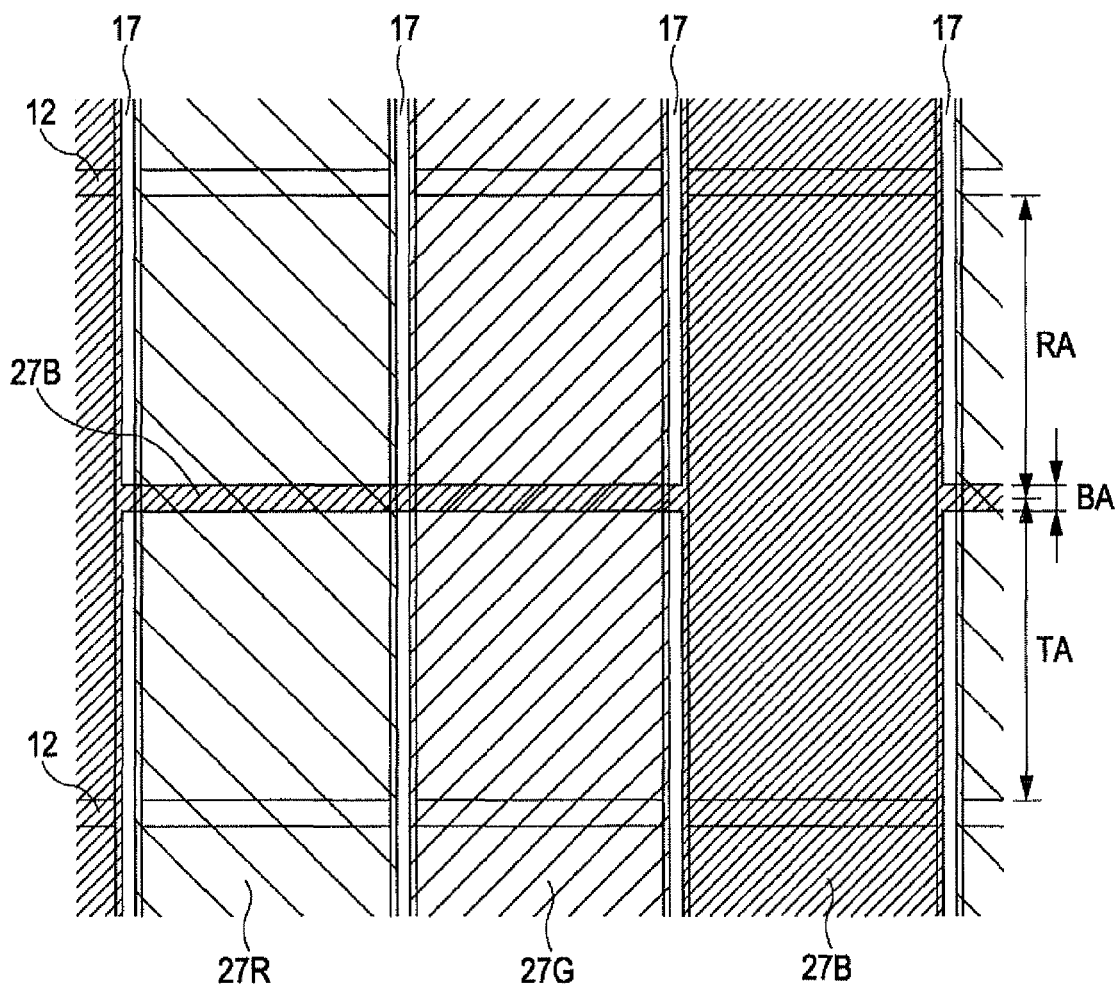
FIG. 5 is a plan view that schematically illustrates an example of the configuration of a set of color filter layers of an FFS transflective liquid crystal display panel according to the second exemplary embodiment of the invention.
Figure 6:
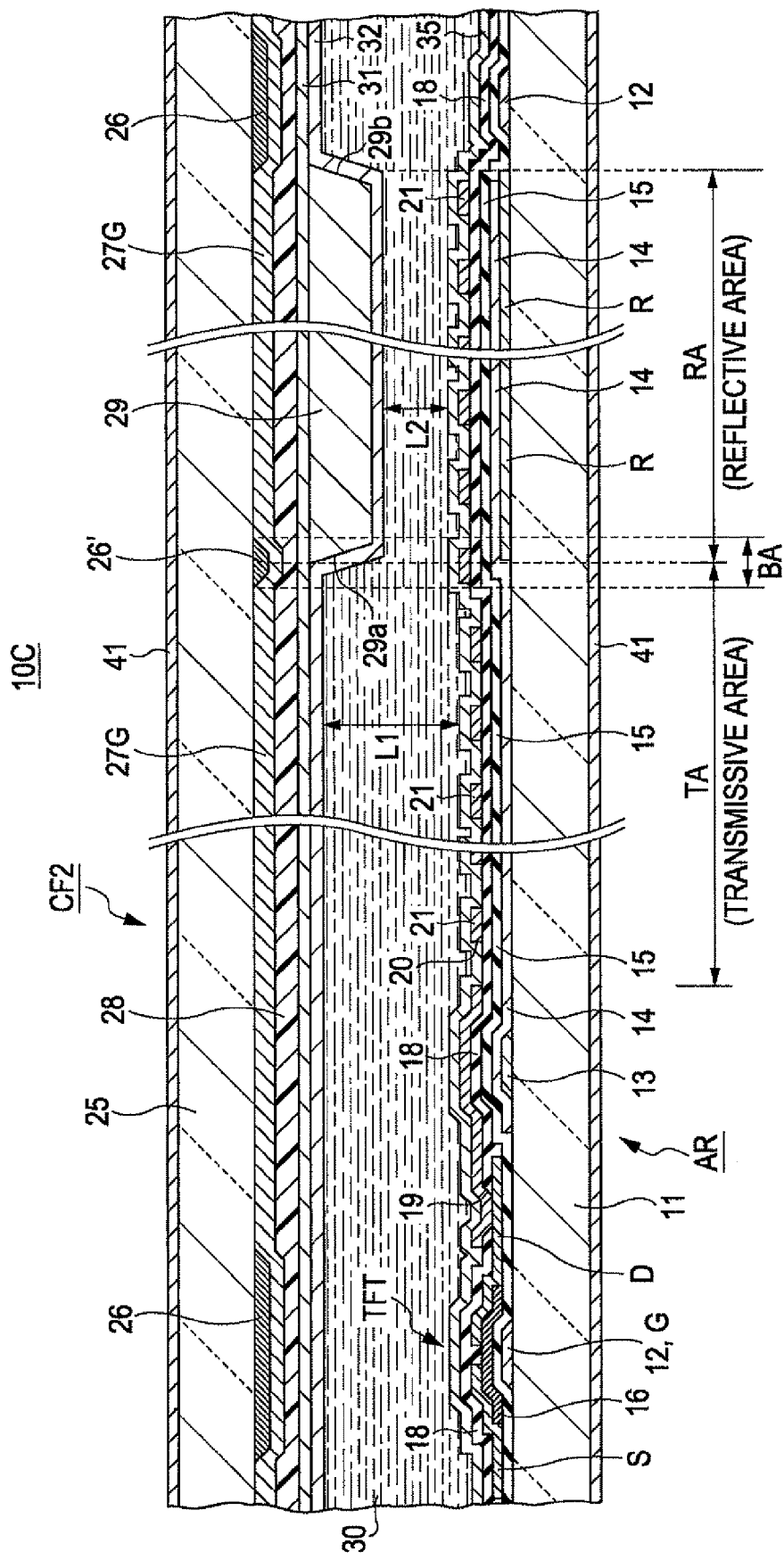
FIG. 6 is a sectional view that schematically illustrates an example of the layer/lamination structure of an FFS transflective liquid crystal display panel according to a third exemplary embodiment of the invention, which corresponds to the layer/lamination structure of an FFS transflective liquid crystal display panel according to the first exemplary embodiment of the invention, which is shown in FIG. 2.
Figure 7:
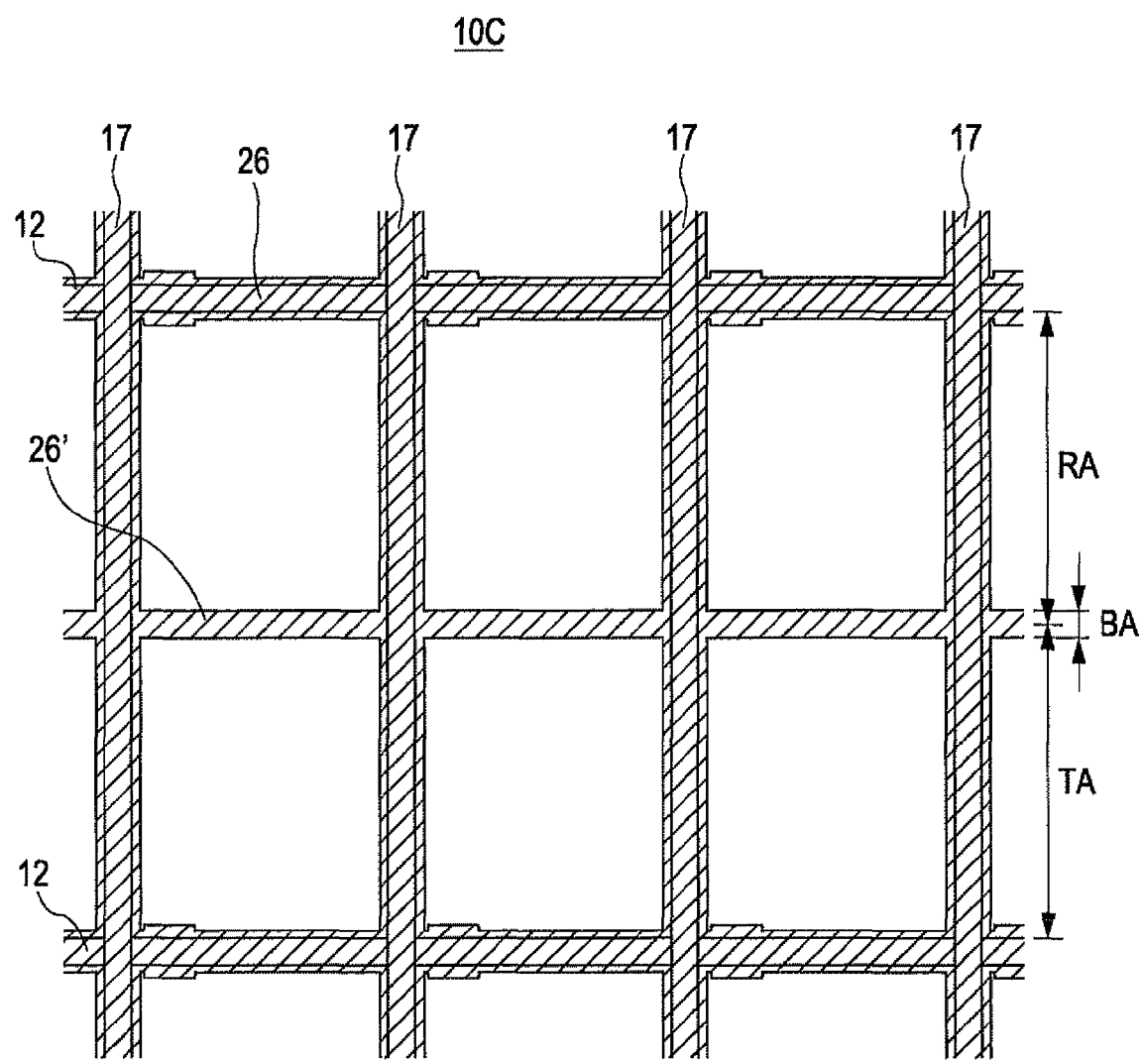
FIG. 7 is a plan view that schematically illustrates an example of the configuration of a light-shielding layer of an FFS transflective liquid crystal display panel according to the third exemplary embodiment of the invention.
Figure 8:
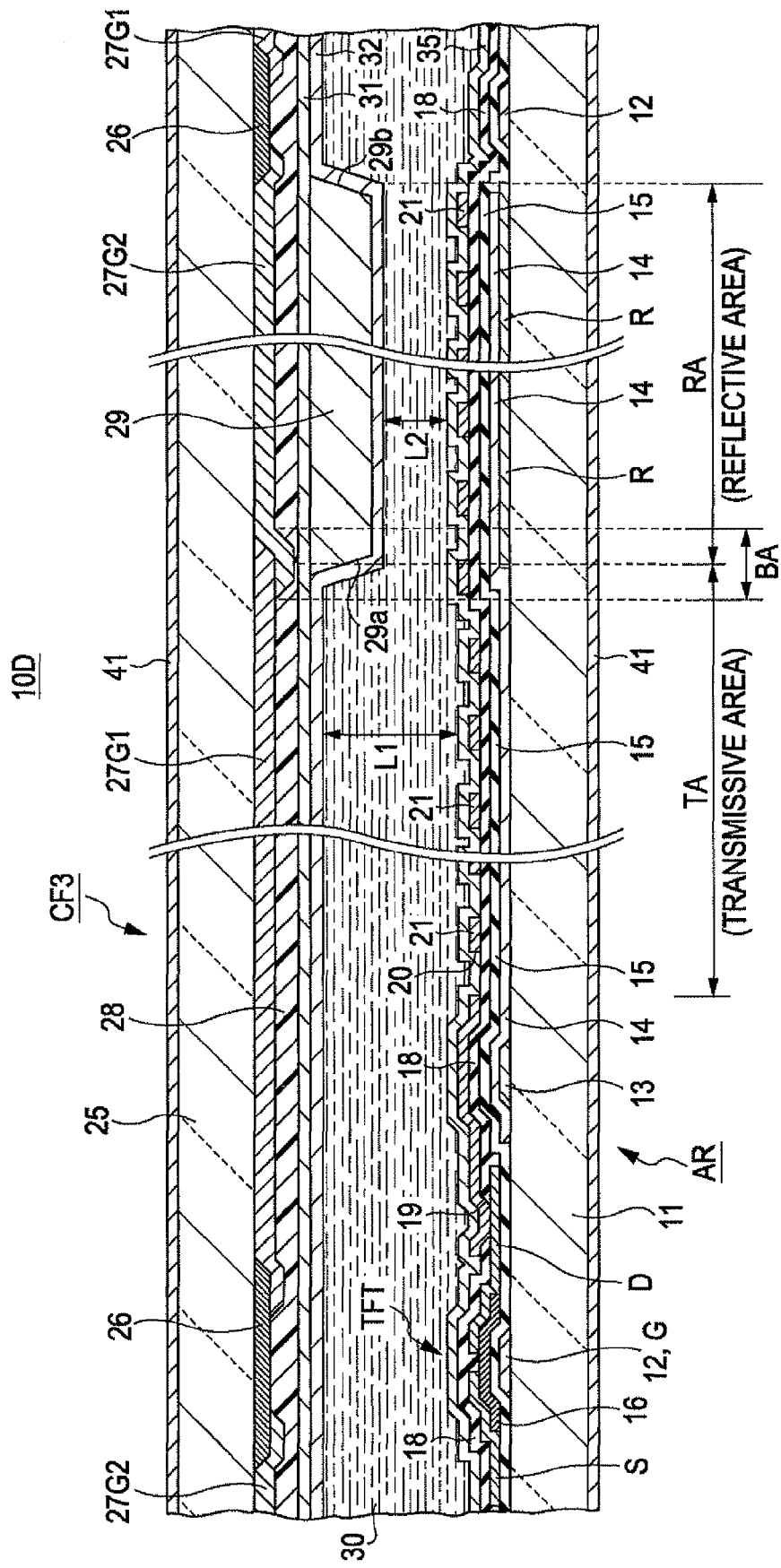
FIG. 8 is a sectional view that schematically illustrates an example of the layer/lamination structure of an FFS transflective liquid crystal display panel according to a fourth exemplary embodiment of the invention, which corresponds to the layer/lamination structure of an FFS transflective liquid crystal display panel according to the first exemplary embodiment of the invention, which is shown in FIG. 2.
Figure 12A:
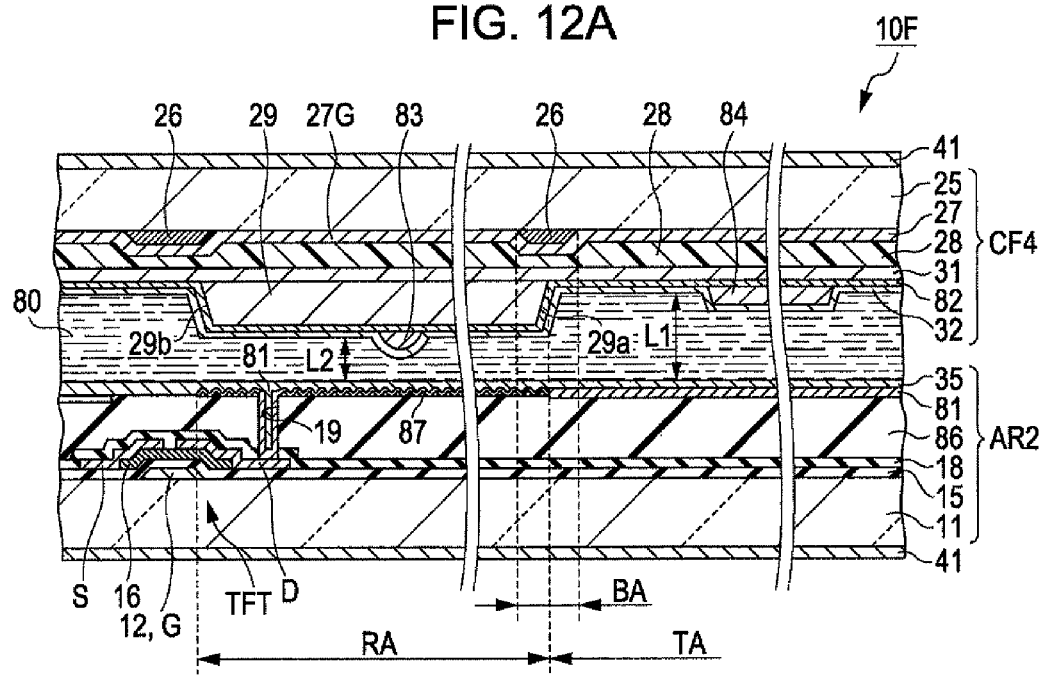
FIG. 12A is a sectional view taken along the line XIIA-XIIA of FIG. 11.
Figure 12B:
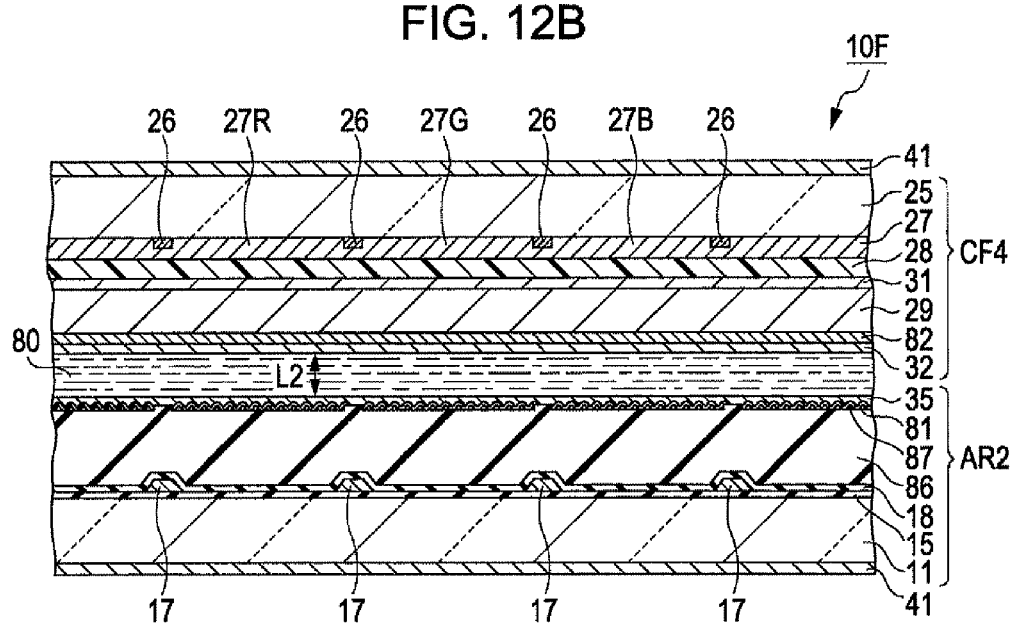
FIG. 12B is a sectional view taken along the line XIIB-XIIB of FIG. 11.
Figure 13A:
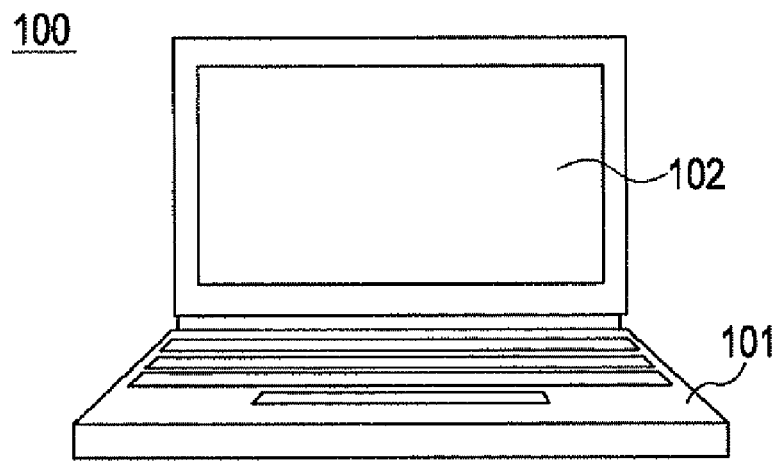
FIG. 13 is a set of diagrams that schematically illustrates an example of the configuration of an electronic apparatus that is provided with a transflective liquid crystal display panel according to any of exemplary embodiments of the invention, including any variation example thereof; more specifically, FIG. 13A schematically illustrates an example of the configuration of a personal computer as a non-limiting example of a variety of electronic apparatuses to which the invention can be applied.
FIG. 13B schematically illustrates an example of the configuration of a mobile phone as a non-limiting example of a variety of electronic apparatuses to which the invention can be applied.
Figure 13B:
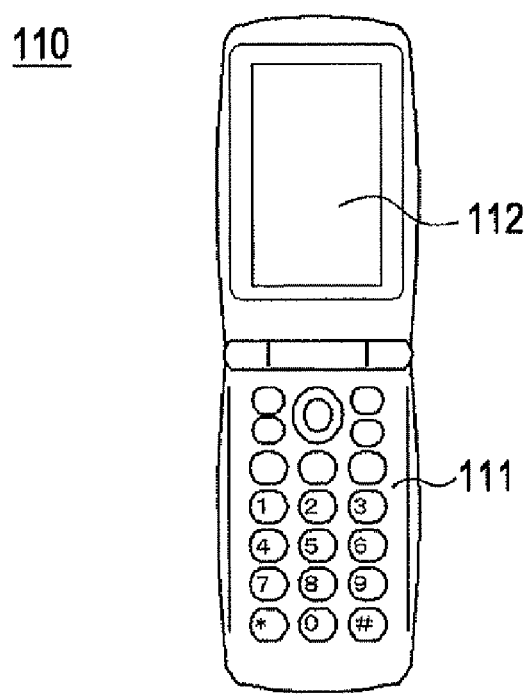
Figure 14:
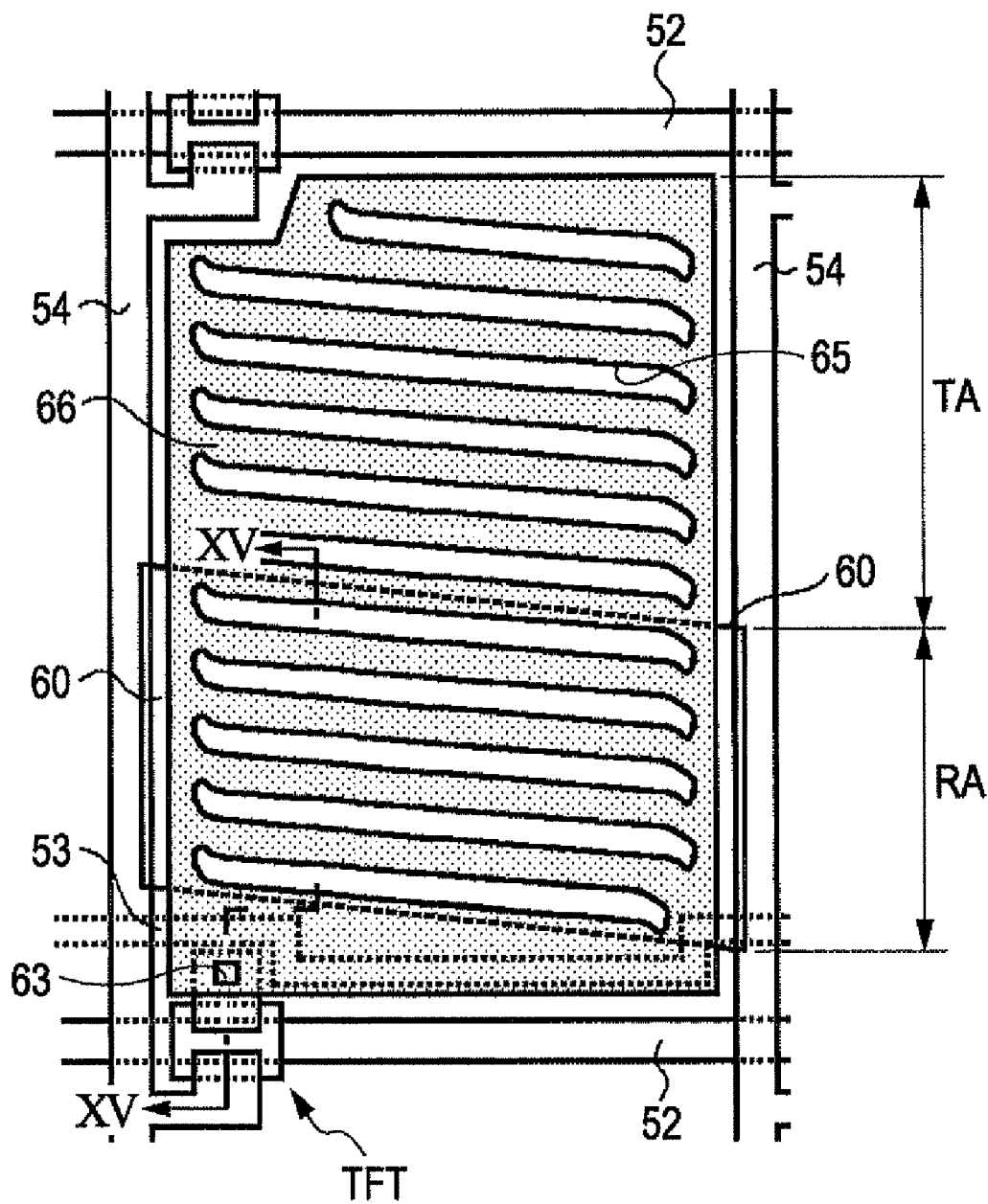
FIG. 14 is a plan view that schematically illustrates an example of the pixel configuration of an FFS transflective liquid crystal display panel of the related art; more specifically.

FIG. 1 is a plan view that schematically illustrates an example of the pixel configuration of an FFS (horizontal electric-field) transflective liquid crystal display panel according to a first exemplary embodiment of the invention; more specifically, FIG. 1 shows three pixels of an FFS transflective liquid crystal display panel according to the first exemplary embodiment of the invention whereas a color filter substrate thereof is omitted from FIG. 1. FIG. 2 is a sectional view taken along the line II-II of FIG. 1. FIG. 3 is a plan view that schematically illustrates an example of the configuration of a set of color filter layers of an FFS transflective liquid crystal display panel according to the first exemplary embodiment of the invention. FIG. 4 is a sectional view that schematically illustrates an example of the layer/lamination structure of an FFS transflective liquid crystal display panel according to a second exemplary embodiment of the invention, which corresponds to the layer/lamination structure of an FFS transflective liquid crystal display panel according to the first exemplary embodiment of the invention, which is shown in FIG. 2. FIG. 5 is a plan view that schematically illustrates an example of the configuration of a set of color filter layers of an FFS transflective liquid crystal display panel according to the second exemplary embodiment of the invention. FIG. 6 is a sectional view that schematically illustrates an example of the layer/lamination structure of an FFS transflective liquid crystal display panel according to a third exemplary embodiment of the invention, which corresponds to the layer/lamination structure of an FFS transflective liquid crystal display panel according to the first exemplary embodiment of the invention, which is shown in FIG. 2. FIG. 7 is a plan view that schematically illustrates an example of the configuration of a light-shielding layer of an FFS transflective liquid crystal display panel according to the third exemplary embodiment of the invention. FIG. 8 is a sectional view that schematically illustrates an example of the layer/lamination structure of an FFS transflective liquid crystal display panel according to a fourth exemplary embodiment of the invention, which corresponds to the layer/lamination structure of an FFS transflective liquid crystal display panel according to the first exemplary embodiment of the invention, which is shown in FIG. 2. FIG. 9 is a plan view that schematically illustrates an example of the configuration of a set of color filter layers of an FFS transflective liquid crystal display panel according to the fourth exemplary embodiment of the invention. FIG. 10 is a sectional view that schematically illustrates a variation example of the layer/lamination structure of an FFS transflective liquid crystal display panel according to any of the first, second, third, and fourth exemplary embodiments of the invention, which corresponds to the layer/lamination structure of an FFS transflective liquid crystal display panel according to the first exemplary embodiment of the invention, which is shown in FIG. 2. FIG. 11 is a plan view that schematically illustrates an example of the pixel area of a vertical electric-field transflective liquid crystal display panel according to a fifth exemplary embodiment of the invention; more specifically, FIG. 11 shows three pixels of a vertical electric-field transflective liquid crystal display panel according to the fifth exemplary embodiment of the invention whereas a color filter substrate thereof is omitted from FIG. 11. FIG. 12 is a set of sectional views that schematically illustrates an example of the layer/lamination structure of a vertical electric-field transflective liquid crystal display panel according to the fifth exemplary embodiment of the invention; more specifically, FIG. 12A is a sectional view taken along the line XIIA-XIIA of FIG. 11; FIG. 12B is a sectional view taken along the line XIIB-XIIB of FIG. 11. FIG. 13 is a set of diagrams that schematically illustrates an example of the configuration of an electronic apparatus that is provided with a transflective liquid crystal display panel according to any of exemplary embodiments of the invention, including any variation example thereof; more specifically, FIG. 13A schematically illustrates an example of the configuration of a personal computer as a non-limiting example of a variety of electronic apparatuses to which the invention can be applied; FIG. 13B schematically illustrates an example of the configuration of a mobile phone as a non-limiting example of a variety of electronic apparatuses to which the invention can be applied. In each of FIGS. 3, 5, 7, and 9, the plurality of scanning lines 12 and the plurality of signal lines 17 only are shown. That is, other wiring pattern that is formed over the array substrate AR is not shown therein in order to simplify illustration.

First Embodiment

With reference to FIGS. 1 and 2, an example of the configuration of an FFS transflective liquid crystal display panel 10A according to a first exemplary embodiment of the invention is explained below. Note that an FFS transflective liquid crystal display panel 10A described below is a non-limiting example of a horizontal electric-field transflective liquid crystal display panel according to a first exemplary embodiment of the invention. An FFS transflective liquid crystal display panel 10A according to the first exemplary embodiment of the invention has an array substrate AR. The array substrate AR is a non-limiting example of a "first substrate" according to an aspect of the invention. As a base substrate substance thereof, the array substrate AR has a transparent substrate 11, which is made of a transparent material such as glass, though not limited thereto. As shown in FIGS. 1 and 2, a plurality of scanning lines 12 is formed as a layer component of the array substrate AR on the surface of the transparent substrate 11. The plurality of scanning lines 12 extends in parallel with one another. Each of these scanning lines 12 has a bi-layer wiring structure that is made up of the lamination of molybdenum (Mo) and aluminum (Al). A plurality of common lines 13 is formed on the transparent substrate 11 of the array substrate AR. Each of these common lines 13 extends along the corresponding one of the scanning lines 12. The common line 13 is made of the same material as that of the scanning line 12.

A reflecting plate R is formed on the transparent substrate 11 of the array substrate AR. The reflecting plate R is formed at a region corresponding to the reflective area RA of each pixel, which will be described later. The reflecting plate R is made of aluminum or aluminum alloy. The surface of the reflecting plate R is formed to be rough. In other words, the reflecting plate R has convexes and concaves. However, it is shown in FIG. 2 as a smooth surface in order to simplify illustration. A pixel area is formed as a region demarcated by the scanning lines 12 and the common lines 13. After the formation of a film such as an ITO (Indium Tin Oxide) film, an IZO (Indium Zinc Oxide) film, or the like thereon, a lower electrode 14 that is made of a transparent electro-conductive material is formed in the pixel area. The lower electrode 14 is formed to overlie the common line 13 and the reflecting plate F. Accordingly, the lower electrode 14 is electrically connected to the common line 13. On the other hand, the lower electrode 14 is not electrically connected to the scanning line 12 and the gate electrode G. The lower electrode 14 functions as a common electrode.

A gate insulation film 15 is formed over the entire surface of the transparent substrate 11 on which the scanning line 12, the common line 13, the reflecting plate R, and the lower electrode 14 are formed. The gate insulation film 15 is made of a transparent insulation material such as silicon nitride or silicon oxide, though not limited thereto. A semiconductor layer 16 is formed at a TFT formation area on the surface of the gate insulation film 15. The semiconductor layer 16 is made of, without any limitation thereto, amorphous silicon, which is hereafter abbreviated as "a-Si". A regional part of the scanning line 12 over which the semiconductor layer 16 is formed functions as the gate electrode of the TFT when viewed in plan.

A plurality of signal lines 17 is formed on the surface of the gate insulation film 15. A part of the signal line 17 is formed as a source electrode S. The signal line 17 has a, for example, Mo/Al/Mo triple-layer structure, which is formed as an electro-conductive layer. In addition to the source electrode S, a drain electrode D is formed on the surface of the gate insulation film 15. The source electrode portion S of the signal line 17 partially overlies the surface of the semiconductor layer 16. The drain electrode portion D also partially overlies the surface of the semiconductor layer 16. A protective insulation film (i.e., passivation film) 18 that is made of a transparent insulation material such as silicon nitride or silicon oxide, though not limited thereto, is formed on the gate insulation film 15 over the entire surface of the transparent substrate 11. A contact hole 19 is formed through the protective insulation film 18 at a position corresponding to the drain electrode D.

An upper electrode 21 is formed on the protective insulation film 18. When viewed in plan, the upper electrode 21 is formed in an area that is enclosed by the scanning lines 12 and the signal lines 17 so as to form a pattern shown in FIG. 1. The above-mentioned area is referred to as a pixel area in the description of this specification. The upper electrode 21 is made of a transparent electro-conductive material such as ITO (Indium Tin Oxide), IZO (Indium Zinc Oxide), or the like. The upper electrode 21 is a non-limiting example of a "second electrode" according to an aspect of the invention. The upper electrode 21 has a plurality of slits 20. The upper electrode 21 is electrically connected to the drain electrode D via the contact hole 19. Therefore, the upper electrode 21 functions as a pixel electrode. An alignment film (i.e., orientation film) 35 is formed thereon over the entire surface of the transparent substrate 11.

It is preferable that, when viewed in plan, the upper electrode 21 that has a plurality of slits 20 should have the shape of the teeth of a comb in each pixel area. One end of each of the plurality of slits 20 is formed as an open-end portion 20a, which is formed at the signal-line (17) side. The other end of each of the plurality of slits 20 is formed as a closed-end portion 20b. With such a structure, the aperture ratio of each of the slits 20 at the open-end (20a) side is improved, which makes it possible to display an image with enhanced brightness. In the foregoing description of the two-dimensional structure of the upper electrode 21 according to the first exemplary embodiment of the invention, it is explained that one end (20a) of each of the slits 20 is formed as an open end. However, the scope of the invention is not limited to such an exemplary configuration. For example, both ends of each of the slits 20 may be formed as closed ends.

The FFS transflective liquid crystal display panel 10A according to the first exemplary embodiment of the invention has a color filter substrate CF. The color filter substrate CF is a non-limiting example of a "second substrate" according to an aspect of the invention. As a base substrate substance thereof, the color filter substrate CF has a transparent substrate 25, which is made of a transparent material such as glass, though not limited thereto. A light-shielding layer 26 is formed on the surface of the transparent substrate 25 at a position corresponding to the scanning line 12, the signal line 17, and the TFT, which are formed over the transparent substrate 11 of the array substrate AR. A set of color filter layers 27, which corresponds to, for example, three primary color components of red (R), green (G), and blue (B), is formed on the surface of the transparent substrate 25 in an area demarcated by the light-shielding layer 26. An example of the layout of color filter layers 27R, 27G, and 27B is shown in FIG. 3. A planarizing film 28 is formed over the light-shielding layer 26. In addition, the planarizing film 28 is formed in such a manner that it covers the color filter layers 27R, 27G, and 27B for smoothing the surfaces thereof. The planarizing film 28 is made of a transparent resin or the like. An alignment film 31 is formed in such a manner that it covers the surface of the planarizing film 28. The alignment film 31 has been subjected to orientation treatment (i.e., alignment treatment) that determines the direction (i.e., orientation) of the phase-delay axis of a phase difference layer 29, which is described below. The phase difference layer 29 is formed at a region corresponding to the reflective area RA over the color filter substrate CF, or more specifically, on the surface of the alignment film 31 thereof. The phase difference layer 29 is made of, for example, polymeric liquid crystal compound. The phase difference layer 29 is formed as a result of the coating of liquid crystal compound such as monomer or polymer, which is followed by heating or ultraviolet irradiation for polymerization (i.e., pattern formation) thereof. The orientation of the phase-difference axis of the phase difference layer 29 is determined on the basis of orientation treatment that is applied to the alignment film 31 during the polymerization process. Assuming that the reference wavelength λ of a beam of light that passes through the liquid crystal layer 30 is 550 nm, the retardation (i.e., phase difference) of the phase difference layer 29 is set at, for example, ½λ. Another alignment film 32 is formed on the above-mentioned alignment film 31 and the phase difference layer 29 over the entire surface of the transparent substrate 25. The alignment film 32 has been subjected to predetermined orientation treatment so as to orient the liquid crystal molecules of the liquid crystal layer 30 in a predetermined direction. The film thickness of the phase difference layer 29 is adjusted in such a manner that the relationship between the thickness L1 of the liquid crystal layer 30 at the transmissive area TA and the thickness L2 of the liquid crystal layer 30 at the reflective area RA that is expressed in the following mathematical formula (1) is satisfied. If the following equality (1) holds true, the retardation of the reflective area RA is ¼λ under the condition that the retardation of the transmissive area TA is ½λ. Accordingly, the distance of a transmissive optical path along which a beam of light travels at the transmissive area TA through the liquid crystal layer 30 is made equal to the distance of a reflective optical path along which a beam of light travels at the reflective area RA through the liquid crystal layer 30. Therefore, it is possible to optimize image display, thereby achieving high display quality.

$$L2 = (1/2) L1 \tag{1}$$

After the formation of various layers and components described above, the array substrate AR and the color filter substrate CF are provided opposite to each other. More specifically, the array substrate AR and the color filter substrate CF are set opposite to each other in such a manner that the upper electrode 21 of the array substrate AR faces the color filter layers 27R, 27G, and 27B of the color filter substrate CF with a certain space left therebetween. Then, liquid crystal is injected into the space. Accordingly, the liquid crystal is sealed between the array substrate AR and the color filter substrate CF. In this way, the FFS transflective liquid crystal display panel 10A according to the first exemplary embodiment of the invention is produced. A polarizing plate 41 is formed on the outer surface of each of the transparent substrates 11 and 25. The FFS transflective liquid crystal display panel 10A according to the first exemplary embodiment of the invention, which has the layer structure explained above, is provided with the lower electrode 14 and the upper electrode 21. When viewed in plan, the lower electrode 14 and the upper electrode 21 overlap each other. The gate insulation film 15 and the protective insulation film 18 are formed between the lower electrode 14 and the upper electrode 21, The liquid crystal layer 30 is driven as a result of the generation of a horizontal electric field between the lower electrode 14 and the upper electrode 21.

As has already been explained above, the phase difference layer 29 is formed in the reflective area RA in the configuration of the FFS transflective liquid crystal display panel 10A according to the first exemplary embodiment of the invention. When such a configuration is adopted, it is practically impossible or at best difficult to adjust retardation at a side portion (i.e., end portion) of the phase difference layer 29 that is located inside the pixel area. That is, in such a configuration, it is practically impossible or at best difficult to adjust retardation at a side portion 29a of the phase difference layer 29 that is formed inside a border area BA, which is a region around the borderline between the transmissive area TA and the reflective area RA. If the above-mentioned regional portion is displayed on the screen without any effective solution, because of a difficulty in the adjustment of retardation thereat, the image display performance of the FFS transflective liquid crystal display panel 10A will be degraded. In order to avoid such degradation in image display quality, the FFS transflective liquid crystal display panel 10A according to the first exemplary embodiment of the invention has a unique feature in the structure of the color filter substrate CF.

In the following description, the structure of the color filter substrate CF is explained in more detail with reference to FIGS. 2 and 3. In order to facilitate visualization of the color filter layers 27R, 27G, and 27B, which corresponds to, for example, three primary color components of red (R), green (G), and blue (B), respectively, three hatching patterns different from one another are used in FIG. 3. The border area BA described herein is a strip-shaped area that is elongated along one side portion 29a of the phase difference layer 29. The width of the elongated border area BA is determined on the basis of the "taper angle", which is the inclination angle of the side portion 29a of the phase difference layer 29, the positional accuracy in the formation of the phase difference layer 29 on the color filter substrate CF, and the positional accuracy in the assembly of the color filter substrate CF and the array substrate AR. In other words, the border area BA can be defined as a region at which the side portion 29a of the phase difference layer 29 might overlap the transmissive area TA or the reflective area RA when viewed in plan. One end of the reflecting plate R, which is formed on the transparent substrate 11 of the array substrate AR, determines the borderline between the transmissive area TA and the reflective area RA. Therefore, the border area BA can be defined as an error range that is determined in view of the inclination angle of the above-mentioned one side portion 29a of the phase difference layer 29, the positional accuracy in the formation of the phase difference layer 29 on the color filter substrate CF, and the positional accuracy in the assembly of the color filter substrate CF and the array substrate AR. One end of the reflecting plate R determines the center of the border area BA. The other side portion 29b of the phase difference layer 29 is formed at a region that overlaps, when viewed in plan, a light-shielding region at which the light-shielding layer 26 is formed. The light-shielding area demarcates the pixel area.

The color filter layers 27R, 27G, and 27B, which correspond to three primary color components of R (red), G (green), and B (blue), respectively, are formed on the transparent substrate 25 of the color filter substrate CF in a stripe array pattern. Accordingly, a plurality of pixel areas that is arrayed in a line along each signal line 17 displays the same single color. Among these color filter layers 27R, 27G, and 27B, which corresponds to three primary color components of R, G, and B, respectively, it is the color filter layer 27B that transmits the color of the lowest light transmittance (i.e., lowest light transmission factor), which is blue. That is, it is the blue color filter layer 27B that transmits the color of the lowest visual sensitivity (i.e., lowest visibility factor). The FFS transflective liquid crystal display panel 10A according to the first exemplary embodiment of the invention has, as shown in FIGS. 2 and 3, the following color-filter layout. In the red-filter pixel area at which the red color filter layer 27R is formed when viewed in plan, the red color filter layer 27R is not formed at a partial region that overlaps, when viewed in plan, the side portion 29a of the phase difference layer 29. That is, the red color filter layer 27R is not formed at a partial region corresponding to the border area BA in the red-filter pixel area. In like manner, in the green-filter pixel area at which the green color filter layer 27G is formed when viewed in plan, the green color filter layer 27G is not formed at a partial region that overlaps, when viewed in plan, the side portion 29a of the phase difference layer 29. That is, the green color filter layer 27G is not formed at a partial region corresponding to the border area BA in the green-filter pixel area. In contrast, in the blue-filter pixel area at which the blue color filter layer 27B is formed when viewed in plan, the blue color filter layer 27B is formed to overlap, when viewed in plan, the side portion 29a of the phase difference layer 29. That is, the blue color filter layer 27B is formed at a region corresponding to the border area BA in addition to the transmissive area TA and the reflective area RA in the blue-filter pixel area. In the red-filter pixel area at which the red color filter layer 27R is formed when viewed in plan, although the red color filter layer 27R is not formed at the partial region that overlaps, when viewed in plan, the side portion 29a of the phase difference layer 29 (i.e., border area BA), which will be formed in a subsequent manufacturing process, the blue color filter layer 27B is formed in place of the red color filter layer 27R in such a manner that it extends along the side portion 29a of the phase difference layer 29. In the green-filter pixel area at which the green color filter layer 27G is formed when viewed in plan, although the green color filter layer 27G is not formed at the partial region that overlaps, when viewed in plan, the side portion 29a of the phase difference layer 29 (i.e., border area BA), which will be formed in a subsequent manufacturing process, the blue color filter layer 27B is formed in place of the green color filter layer 27G in such a manner that it extends along the side portion 29a of the phase difference layer 29.

If the above-explained structure of the set of color filter layers 27R, 27G, and 27B, which corresponds to three primary color components of R, G, and B, respectively, is adopted, it is possible to manufacture the color filter 27 in an easy manner. Specifically, it is possible to produce the color filter 27 merely by changing a mask pattern that is used in the light-exposure formation process of the color filter layers 27R, 27G, and 27B. It is preferable to perform the light-exposure formation of the color filter 27 as follows. As a first step thereof, the red color filter layer 27R and the green color filter layer 27G are formed in the red-filter pixel area and the green-filter pixel area, respectively. Next, the blue color filter layer 27B is formed at the corresponding pixel area and the border area BA in a concurrent manner. That is, the formation of the blue color filter layer 27B at the blue-filter pixel area is performed in the same single process as the formation of the blue color filter layer 27B at the border area BA across the red color filter layer 27R, the green color filter layer 27G, and the blue color filter layer 27B. If so manufactured, it is possible to form the color filter layers 27R, 27G, and 27B easily without increasing the number of production processes. An elongated portion of the blue color filter layer 27B that is formed at a region corresponding to the border area BA is formed to partially overlap, at each side thereof, the red color filter layer 27R and the green color filter layer 27G when viewed in plan. Since it is designed that each edge of the elongated portion of the blue color filter layer 27B should partially overlap the red color filter layer 27R and the green color filter layer 27G when viewed in plan, it is possible to substantially reduce the risk of any partial absence of the color filter 27 in the border area BA.

Since the FFS transflective liquid crystal display panel 10A according to the first exemplary embodiment of the invention has the layout/structure explained above, the blue color filter layer 27B, which transmits the color of the lowest light transmission factor and thus has the lowest visibility factor, is formed at the region that overlaps, when viewed in plan, the side portion 29a of the phase difference layer 29 (i.e., border area BA) in each of the red-filter pixel area, the green-filter pixel area, and the blue-filter pixel area. That is, in the configuration of the FFS transflective liquid crystal display panel 10A according to the first exemplary embodiment of the invention, the blue color filter layer 27B is used as a member that lowers a light transmission factor. With such a structure, even if there is some aberration (e.g., error or deviation, though not limited thereto) in retardation that is attributable to a difficulty in the adjustment of retardation at the tapered (i.e., inclined) side portion 29a of the phase difference layer 29, it is possible to make it less perceivable on the display. Therefore, it is possible to avoid any substantial degradation in image display performance. In the foregoing description of the configuration of the FFS transflective liquid crystal display panel 10A according to the first exemplary embodiment of the invention, it is explained that the blue color filter layer 27B is formed at the border area BA in the green-filter pixel area, which corresponds to a region at which the green color filter layer 27G is formed. However, the scope of this aspect of the invention is not limited to such an exemplary configuration. In place of the blue color filter layer 27B, the red color filter layer 27R may be formed at the border area BA in the green-filter pixel area. Such a modified configuration offers the advantageous effects of this aspect of the invention to some extent.

Second Embodiment

In the foregoing description of the configuration of the FFS transflective liquid crystal display panel 10A according to the first exemplary embodiment of the invention, it is explained that the blue color filter layer 27B only is formed at the border area BA in the red-filter pixel area, which corresponds to a region at which the red color filter layer 27R is formed, and the border area BA in the green-filter pixel area, which corresponds to a region at which the green color filter layer 27G is formed. However, the scope of this aspect of the invention is not limited to such an exemplary configuration. In the following description, an FFS transflective liquid crystal display panel 10B according to a second exemplary embodiment of the invention, which has the modified layout/structure of the color filter 27 formed in the border area BA, is explained with reference to FIGS. 4 and 5. All components, layers, and other constituent elements of the array substrate AR of the FFS transflective liquid crystal display panel 10B according to the second exemplary embodiment of the invention described below are the same as the components, layers, and other constituent elements of the array substrate AR of the FFS transflective liquid crystal display panel 10A according to the first exemplary embodiment of the invention described above. In addition, some components, layers, and other constituent elements of the color filter substrate CF1 of the FFS transflective liquid crystal display panel 10B according to the second exemplary embodiment of the invention described below are the same as the corresponding components, layers, and other constituent elements of the color filter substrate CF of the FFS transflective liquid crystal display panel 10A according to the first exemplary embodiment of the invention described above. Accordingly, in the following description of the FFS transflective liquid crystal display panel 10B according to the second exemplary embodiment of the invention, differences in the structure thereof from that of the FFS transflective liquid crystal display panel 10A according to the first exemplary embodiment of the invention described above are mainly explained. It should be noted that, in the following description of the FFS transflective liquid crystal display panel 10B according to the second exemplary embodiment of the invention, the same reference numerals are consistently used for the same components, layers, and other constituent elements as those of the FFS transflective liquid crystal display panel 10A according to the first exemplary embodiment of the invention so as to omit, if appropriate, any redundant explanation or simplify explanation thereof. In order to facilitate visualization of the color filter layers 27R, 27G, and 27B, which corresponds to, for example, three primary color components of red (R), green (G), and blue (B), respectively, three hatching patterns different from one another are used in FIG. 5.

The FFS transflective liquid crystal display panel 10B according to the second exemplary embodiment of the invention has a color filter substrate CF1. As a base substrate substance thereof, the color filter substrate CF1 has the transparent substrate 25, which is made of a transparent material such as glass, though not limited thereto. As shown in FIG. 4, the light-shielding layer 26 is formed on the inner surface of the transparent substrate 25 at a position corresponding to the scanning line 12, the signal line 17, and the TFT, which are formed over the transparent substrate 11 of the array substrate AR. As further illustrated therein, the polarizing plate 41 is formed on the outer surface of the transparent substrate 25 of the color filter substrate CF1. As shown in FIG. 5, the red color filter layer 27R is formed in such a manner that it covers the entire surface of the corresponding pixel area, which is herein referred to as a red-filter pixel area. The green color filter layer 27G is formed in such a manner that it covers the entire surface of the corresponding pixel area, which is herein referred to as a green-filter pixel area. The blue color filter layer 27B is formed in such a manner that it covers the entire surface of the corresponding pixel area, which is herein referred to as a blue-filter pixel area. In addition, a portion of the blue color filter layer 27B is formed so as to cover the border area BA in the red-filter pixel area, which corresponds to a region at which the red color filter layer 27R is formed, and the border area BA in the green-filter pixel area, which corresponds to a region at which the green color filter layer 27G is formed. In the configuration of the FFS transflective liquid crystal display panel 10B according to the second exemplary embodiment of the invention, the side portion 29a of the phase difference layer 29 is formed to overlap, when viewed in plan, the border area BA, which is a region around the borderline between the transmissive area TA and the reflective area RA as in the configuration of the FFS transflective liquid crystal display panel 10A according to the first exemplary embodiment of the invention explained above. The regional portion of the blue color filter layer 27B that is formed along the side portion 29a of the phase difference layer 29 in the red-filter pixel area overlies the red color filter layer 27R. In addition, the regional portion of the blue color filter layer 27B that is formed along the side portion 29a of the phase difference layer 29 in the green-filter pixel area overlies the green color filter layer 27G. Since the planarizing film 28 is formed in such a manner that it covers the color filter layers 27R, 27G, and 27B for smoothing the surfaces thereof, there is no risk that the overlying formation of the elongated portion of the blue color filter layer 27B, which is formed on the red color filter layer 27R along the side portion 29a of the phase difference layer 29 in the red-filter pixel area and on the green color filter layer 27G along the side portion 29a of the phase difference layer 29 in the green-filter pixel area, adversely affects the retardation of the phase difference layer 29 and/or the liquid crystal layer 30.

As shown in FIG. 4, the alignment film 31, which has been subjected to orientation treatment that determines the orientation (i.e., direction) of the phase-delay axis of the phase difference layer 29, is formed on the surface of the planarizing film 28. The phase difference layer 29 is formed at a region corresponding to the reflective area RA on the alignment film 31 Another alignment film 32 is formed on the surface of the phase difference layer 29 and the surface of the alignment film 31. The color filter substrate CF1 of the FFS transflective liquid crystal display panel 10B according to the second exemplary embodiment of the invention has the structure explained above. After the formation of various layers and components described above, the array substrate AR and the color filter substrate CF1 are provided opposite to each other. More specifically, as done in the production process of the FFS transflective liquid crystal display panel 10A according to the foregoing first exemplary embodiment of the invention, the array substrate AR and the color filter substrate CF1 are set opposite to each other in such a manner that the upper electrode 21 of the array substrate AR faces the color filter layers 27R, 27G, and 27B of the color filter substrate CF1 with a certain space left therebetween. Then, liquid crystal is injected into the space. Accordingly, the liquid crystal is sealed between the array substrate AR and the color filter substrate CF1. In this way, the FFS transflective liquid crystal display panel 10B according to the second exemplary embodiment of the invention is produced.

As explained above, in the configuration of the FFS transflective liquid crystal display panel 10B according to the second exemplary embodiment of the invention, a portion of the blue color filter layer 273 is formed at a region that overlaps, when viewed in plan, the side portion 29a of the phase difference layer 29 in the red-filter pixel area at which the red color filter layer 27R is formed and further at a region that overlaps the side portion 29a of the phase difference layer 29 in the green-filter pixel area at which the green color filter layer 27G is formed. That is, the portion of the blue color filter layer 27B is formed to overlie the red color filter layer 27R at the border area BA in the red-filter pixel area and further overlie the green color filter layer 27G at the border area BA in the green-filter pixel area. For this reason, the light transmission factor of the overlapping area at which the portion of the blue color filter layer 27B overlies the red color filter layer 27R/green color filter layer 27G is further reduced. Therefore, the "blue-and-red" overlapping area at which the portion of the blue color filter layer 27B overlies the red color filter layer 27R has a very low visibility factor. In addition, the "blue-and-green" overlapping area at which the portion of the blue color filter layer 27B overlies the green color filter layer 27G also has a very low visibility factor. Thus, with such a structure, it is possible to avoid, with increased reliability, any substantial degradation in image display performance, which is attributable to a difficulty in the adjustment of retardation at the tapered side portion 29a of the phase difference layer 29. That is, in the configuration of the FFS transflective liquid crystal display panel 10B according to the second exemplary embodiment of the invention, a portion of the blue color filter layer 27B is formed at a region that overlaps the side portion 29a of the phase difference layer 29 in the red-filter pixel area at which the red color filter layer 27R is formed when viewed in plan and further at a region that overlaps the side portion 29a of the phase difference layer 29 in the green-filter pixel area at which the green color filter layer 27G is formed when viewed in plan. The overlapping color-filter structure explained above is used as a member that lowers a light transmission factor. Unlike the above-described region that overlaps the side portion 29a of the phase difference layer 29 (i.e., border area BA) in the red-filter pixel area at which the red color filter layer 27R is formed when viewed in plan and in the green-filter pixel area at which the green color filter layer 27G is formed when viewed in plan, no portion of other color filter layer is formed at a region that overlaps the side portion 29a of the phase difference layer 29 (i.e., border area BA) in the blue-filter pixel area at which the blue color filter layer 27B is formed when viewed in plan. That is, no portion of the red color filter layer 27R or the green color filter layer 27G is formed at a region that overlaps the side portion 29a of the phase difference layer 29 in the blue-filter pixel area. The blue color filter layer 27B has the lowest visibility factor among these three color filter layers 27R, 27G, and 27B. For this reason, despite the fact that there is not any overlapping color-filter structure (in which a portion of one color filter layer overlies another color filter layer) that is formed at the side portion 29a of the phase difference layer 29 (i.e., border area BA) in the blue-filter pixel area, there occurs no substantial degradation in image display performance. Thus, even without such an overlying color-filter structure in the blue-filter pixel area, the adverse optical effects of any aberration in retardation that is attributable to a difficulty in the adjustment of retardation at the tapered side portion 29a of the phase difference layer 29 are less perceivable on the display Therefore, it is possible to avoid any substantial degradation in image display performance. In the foregoing description of the configuration of the FFS transflective liquid crystal display panel 10B according to the second exemplary embodiment of the invention, it is explained that a portion of the blue color filter layer 27B is formed at a region that overlaps the side portion 29a of the phase difference layer 29 in the red-filter pixel area at which the red color filter layer 27R is formed when viewed in plan and further at a region that overlaps the side portion 29a of the phase difference layer 29 in the green-filter pixel area at which the green color filter layer 27G is formed when viewed in plan. It is further explained that a combination of the blue-and-red overlapping structure in which the portion of the blue color filter layer 27B overlies the red color filter layer 27R in the red-filter border area BA and the blue-and-green overlapping structure in which the portion of the blue color filter layer 273 overlies the green color filter layer 27G in the green-filter border area BA is used as a member that lowers a light transmission factor. However, the scope of this aspect of the invention is not limited to such an exemplary configuration. As a modification example of the above-described structure, considering that the red color filter layer 27R also has a low visibility factor, which is lower than that of the green color filter layer 27G, the red color filter layer 27R may be used in place of the blue color filter layer 273 as a constituent element of such an overlapping color-filter structure that lowers a light transmission factor. In the foregoing description of the configuration of the FFS transflective liquid crystal display panel 10B according to the second exemplary embodiment of the invention, it is explained that a portion of the blue color filter layer 27B is formed at a region that overlaps the side portion 29a of the phase difference layer 29 in the red-filter pixel area at which the red color filter layer 27R is formed when viewed in plan and further at a region that overlaps the side portion 29a of the phase difference layer 29 in the green-filter pixel area at which the green color filter layer 27G is formed when viewed in plan. However, the scope of this aspect of the invention is not limited to such an exemplary configuration. For example, no portion of other color filter layer may be formed at a region that overlaps the side portion 29a of the phase difference layer 29 in the red-filter pixel area at which the red color filter layer 27R is formed when viewed in plan. That is, the overlapping color-filter structure described above may be modified in such a manner that a portion of other color filter layer, which is either the red color filter layer 27R and the blue color filter layer 27B, is formed at a region that overlaps the side portion 29a of the phase difference layer 29 only in the green-filter pixel area at which the green color filter layer 27G is formed when viewed in plan.

Third Embodiment

In the following description, an FFS transflective liquid crystal display panel 10C according to a third exemplary embodiment of the invention is explained with reference to FIGS. 6 and 7. The FFS transflective liquid crystal display panel 10C according to the third exemplary embodiment of the invention is provided with a border light-shielding structure that perfectly shields light at the border area BA described above. All components, layers, and other constituent elements of the array substrate AR of the FFS transflective liquid crystal display panel 10C according to the third exemplary embodiment of the invention described below are the same as the components, layers, and other constituent elements of the array substrate AR of the FFS transflective liquid crystal display panel 10A according to the first exemplary embodiment of the invention described above. In addition, some components, layers, and other constituent elements of the color filter substrate CF2 of the FFS transflective liquid crystal display panel 10C according to the third exemplary embodiment of the invention described below are the same as the corresponding components, layers, and other constituent elements of the color filter substrate CF of the FFS transflective liquid crystal display panel 10A according to the first exemplary embodiment of the invention described above. Accordingly, in the following description of the FFS transflective liquid crystal display panel 10C according to the third exemplary embodiment of the invention, differences in the structure thereof from that of the FFS transflective liquid crystal display panel 10A according to the first exemplary embodiment of the invention described above are mainly explained. It should be noted that, in the following description of the FFS transflective liquid crystal display panel 10C according to the third exemplary embodiment of the invention, the same reference numerals are consistently used for the same components, layers, and other constituent elements as those of the FFS transflective liquid crystal display panel 10A according to the first exemplary embodiment of the invention so as to omit, if appropriate, any redundant explanation or simplify explanation thereof. In order to facilitate visualization of the light-shielding layer 26, it is shown as a hatched area in FIG. 7.

The FFS transflective liquid crystal display panel 10C according to the third exemplary embodiment of the invention has a color filter substrate CF2. As a base substrate substance thereof, the color filter substrate CF2 has the transparent substrate 25. As shown in FIG. 6, the light-shielding layer 26 is formed on the inner surface of the transparent substrate 25. The light-shielding region at which the light-shielding layer 26 is formed demarcates the pixel area when viewed in plan. As further illustrated therein, the polarizing plate 41 is formed on the outer surface of the transparent substrate 25. The light-shielding layer 26 is formed at a position corresponding to the scanning line 12, the signal line 17, and the TFT, which are formed over the transparent substrate 11 of the array substrate AR. In addition thereto, in the configuration of the FFS transflective liquid crystal display panel 10C according to the third exemplary embodiment of the invention, a portion of the light-shielding layer 26 is formed to cover a region corresponding to the side portion 29a of the phase difference layer 29. In the configuration of the FFS transflective liquid crystal display panel 10C according to the third exemplary embodiment of the invention, the side portion 29a of the phase difference layer 29 is formed to overlap, when viewed in plan, the border area BA, which is a region around the borderline between the transmissive area TA and the reflective area RA as in the configuration of the FFS transflective liquid crystal display panel 10A according to the first exemplary embodiment of the invention explained earlier. The above-mentioned portion of the light-shielding layer 26 that is formed at the border area BA, which may be hereafter referred to as the light-shielding layer 261, extends across pixel areas. The width of the light-shielding layer 26' is determined on the basis of the taper angle, which is the inclination angle of the side portion 29a of the phase difference layer 29, the positional accuracy in the formation of the phase difference layer 29 on the color filter substrate CF2, and the positional accuracy in the adhesion of the color filter substrate CF2 and the array substrate AR as is the case with the determination of the elongated border area BA on these factors in the configuration of the FFS transflective liquid crystal display panel 10A according to the first exemplary embodiment of the invention.

After the formation of the light-shielding layer 26, which has the border area light-shielding portion 26', the color filter layers 27R, 27G, and 27B, which corresponds to three primary color components of red (R), green (G), and blue (B), respectively, is formed on the surface of the transparent substrate 25. The planarizing film 28 is formed on the color filter layers 27R, 27G, and 27B for smoothing the surfaces thereof. The alignment film 31 is formed on the surface of the planarizing film 28. The phase difference layer 29 is formed at a region corresponding to the reflective area RA on the alignment film 31. Another alignment film 32 is formed on the surface of the phase difference layer 29 and the surface of the alignment film 31. The color filter substrate CF2 of the FFS transflective liquid crystal display panel 10C according to the third exemplary embodiment of the invention has the structure explained above. After the formation of various layers and components described above, the array substrate AR and the color filter substrate CF2 are provided opposite to each other. More specifically, as done in the production process of the FFS transflective liquid crystal display panel 10A according to the foregoing first exemplary embodiment of the invention, the array substrate AR and the color filter substrate CF2 are set opposite to each other in such a manner that the upper electrode 21 of the array substrate AR faces the color filter layers 27R, 27G, and 27B of the color filter substrate CF2 with a certain space left therebetween. Then, liquid crystal is injected into the space. Accordingly, the liquid crystal is sealed between the array substrate AR and the color filter substrate CF2. In this way, the FFS transflective liquid crystal display panel 10C according to the third exemplary embodiment of the invention is produced.

As shown in FIG. 6, in the configuration of the FFS transflective liquid crystal display panel 10C according to the third exemplary embodiment of the invention, the portion 26' of the light shielding layer 26 is formed at a region that overlaps, when viewed in plan, the side portion 29a of the phase difference layer 29 (i.e., border area BA). Therefore, the light shielding layer 26' perfectly shields light at the border area BA. As has already been explained above, in the configuration of the FFS transflective liquid crystal display panel 10C according to the third exemplary embodiment of the invention, the side portion 29a of the phase difference layer 29 is formed to overlap, when viewed in plan, the border area BA, which is a region around the borderline between the transmissive area TA and the reflective area RA. Because of such a border light-shielding structure, there is no risk that the display of this area portion is visually observed from the outside. Thus, if the configuration of the FFS transflective liquid crystal display panel 10C according to the third exemplary embodiment of the invention is adopted, it is possible to avoid, either perfectly or almost perfectly, degradation in image display performance, which is attributable to a difficulty in the adjustment of retardation at the tapered side portion 29a of the phase difference layer 29.

Fourth Embodiment

In the foregoing description of the first, second, and third exemplary embodiments of the invention, it is explained that the color-filter layers correspond to three primary color components of red (R), green (G), and blue (B). However, the scope of the invention is not limited to such an exemplary configuration. For example, the color-filter layers may correspond to four or more colors. In the following description, an FFS transflective liquid crystal display panel 10D according to a fourth exemplary embodiment of the invention is explained with reference to FIGS. 8 and 9. The FFS transflective liquid crystal display panel 10D according to the fourth exemplary embodiment of the invention is provided with a set of color filter layers that corresponds to six colors. All components, layers, and other constituent elements of the array substrate AR of the FFS transflective liquid crystal display panel 10D according to the fourth exemplary embodiment of the invention described below are the same as the components, layers, and other constituent elements of the array substrate AR of the FFS transflective liquid crystal display panel 10A according to the first exemplary embodiment of the invention described above. In addition, some components, layers, and other constituent elements of the color filter substrate CF3 of the FFS transflective liquid crystal display panel 10D according to the fourth exemplary embodiment of the invention described below are the same as the corresponding components, layers, and other constituent elements of the color filter substrate CF of the FFS transflective liquid crystal display panel 10A according to the first exemplary embodiment of the invention described above. Accordingly, in the following description of the FFS transflective liquid crystal display panel 10D according to the fourth exemplary embodiment of the invention, differences in the structure thereof from that of the FFS transflective liquid crystal display panel 10A according to the first exemplary embodiment of the invention described above are mainly explained. It should be noted that, in the following description of the FFS transflective liquid crystal display panel 10D according to the fourth exemplary embodiment of the invention, the same reference numerals are consistently used for the same components, layers, and other constituent elements as those of the FFS transflective liquid crystal display panel 10A according to the first exemplary embodiment of the invention so as to omit, if appropriate, any redundant explanation or simplify explanation thereof. In order to facilitate visualization of a plurality of (six) color filter layers, a plurality of (six) hatching patterns different from one another are used in FIG. 9.

As shown in FIG. 9, a set of color filter layers that is used in the configuration of the FFS transflective liquid crystal display panel 10D according to the fourth exemplary embodiment of the invention is made up of a first red color filter layer 27R1, a first green color filter layer 27G1, a first blue color filter layer 27B1, a second red color filter layer 27R2, a second green color filter layer 27G2, and a second blue color filter layer 27B2. The first red color filter layer 27R1 has greater color density than that of the second red color filter layer 27R2. The first green color filter layer 27G1 has greater color density than that of the second green color filter layer 27G2. The first blue color filter layer 27B1 has greater color density than that of the second blue color filter layer 27B2. The first red color filter layer 27R1, the first green color filter layer 27G1, and the first blue color filter layer 27B1, each of which has greater color density, is formed in the transmissive area TA of the corresponding pixel area. The second red color filter layer 27R2, the second green color filter layer 27G2, and the second blue color filter layer 27B2, each of which has lesser color density, is formed in the reflective area RA of the corresponding pixel area. Each pair of color filter layers, that is, one color filter layer that has greater color density and the other color filter layer that has lesser color density, which correspond to the same color component, is arrayed in the corresponding pixel area. For example, the first red color filter layer 27R1 and the second red color filter layer 27R2, which correspond to the same red color component but differ in red color density from each other, is formed in the red-filter pixel area. The same holds true for the pair of green color filter layers 27G1 and 27G2 as well as the pair of blue color filter layers 27B1 and 27B2.

That is, in the configuration of the FFS transflective liquid crystal display panel 10D according to the fourth exemplary embodiment of the invention, the above-mentioned one (27R1, 27G1, and 27B1) of each pair of color filter layers that corresponds to the same color component as that of the above-mentioned other (27R2, 27G2, and 27B2) thereof but has greater color density than that of the above-mentioned other (27R2, 27G2, and 27B2) thereof is arrayed in the transmissive area TA of the corresponding pixel area, whereas the above-mentioned other (27R2, 27G2, and 27B2) of each pair of color filter layers that corresponds to the same color component as that of the above-mentioned one (27R1, 27G1, and 27B1) thereof but has lesser color density than that of the above-mentioned one (27R1 27G1, and 27B1) thereof is arrayed in the reflective area RA of the corresponding pixel area. The reason why the color-filter structure explained above is adopted in the present embodiment of the invention is as follows. When the FFS transflective liquid crystal display panel 10D according to the fourth exemplary embodiment of the invention performs reflective display with the use of the reflective area RA, external light is reflected at the reflecting plate R. Specifically, at the time of reflective image display, external light enters the FFS transflective liquid crystal display panel 10D as an incident light beam and then gets reflected by the reflecting plate R. Then, the reflected light goes out through the display surface thereof. This means that external light, which is used for reflective display that is performed by means of the reflective area RA, passes through the second red color filter layer 27R2, the second green color filter layer 27G2, and the second blue color filter layer 27B2 twice at the time of reflective image display. That is, external light passes through these second color filter layers 27R2, 27G2, and 27B2 at the time when it enters the FFS transflective liquid crystal display panel 10D as an incident light beam. Then, the external light passes through these second color filter layers 27R2, 27G2, and 27B2 again at the time when it goes out of the FFS transflective liquid crystal display panel 10D as an outgoing light beam. For this reason, if the color filter layer used in the transmissive area TA of a pixel area were the same as that used in the reflective area RA thereof, a reflective image, which is obtained as a result of reflective display that is performed with the use of the reflective area RA, would have greater color density than that of a transmissive image, which is obtained as a result of transmissive display that is performed with the use of the transmissive area TA, which is not desirable. In order to avoid or at least reduce such color density discrepancy, in the configuration of the FFS transflective liquid crystal display panel 10D according to the fourth exemplary embodiment of the invention, the color density of the second red color filter layer 27R2, the second green color filter layer 27G2, and the second blue color filter layer 27B2, each of which is formed in the reflective area RA, is set relatively low, whereas the color density of the first red color filter layer 27R1, the first green color filter layer 27G1, and the first blue color filter layer 27B1, each of which is formed in the transmissive area TA, is set relatively high. It is preferable that the color density of the second red color filter layer 27R2, the second green color filter layer 27G2, and the second blue color filter layer 27B2, each of which is formed in the reflective area RA, should be a half of the color density of the first red color filter layer 27R1, the first green color filter layer 27G1, and the first blue color filter layer 27B1, each of which is formed in the transmissive area TA. With such a preferred structure, it is possible to equalize the color density of a reflective image, which is obtained as a result of reflective display that is performed with the use of the reflective area RA, and the color density of a transmissive image, which is obtained as a result of transmissive display that is performed with the use of the transmissive area TA. That is, with such a preferred structure, it is possible to achieve uniform contrast regardless of whether an image is displayed in a transmissive mode or in a reflective mode.

The FFS transflective liquid crystal display panel 10D according to the fourth exemplary embodiment of the invention has a color filter substrate CF3. As a base substrate substance thereof, the color filter substrate CF3 has the transparent substrate 25. As shown in FIG. 8, the light-shielding layer 26 is formed on the inner surface of the transparent substrate 25 at a position corresponding to the scanning line 12, the signal line 17, and the TFT, which are formed over the transparent substrate 11 of the array substrate AR. As further illustrated therein, the polarizing plate 41 is formed on the outer surface of the transparent substrate 25 of the color filter substrate CF3. The plurality of color filter layers 27R1, 27G1, 27B1, 27R2, 27G2, and 27B2 is formed on the surface of the transparent substrate 25 of the color filter substrate CF3. These color filter layers 27R1, 27G1, 27B1, 27R2, 27G2, and 27B2 are formed in the following steps. As a first step thereof, the first red color filter layer 27R1, the first green color filter layer 27G1, and the first blue color filter layer 27B1, each of which has greater color density, are formed to cover both the transmissive area TA and the border area BA. As the next step thereof, the second red color filter layer 27R2, the second green color filter layer 27G2, and the second blue color filter layer 27B2, each of which has lesser color density, are formed to cover both the reflective area RA and the border area BA. Since the color filter layers 27R1, 27G1, 27B1, 27R2, 27G2, and 27B2 are formed through the formation processes explained above, as illustrated in FIG. 8, the second green color filter layer 27G2, which has the same green color component as that of the first green color filter layer 27G1 but has lesser color density than that of the first green color filter layer 27G1, is formed in the (reflective) green-filter pixel area so as to partially overlie the first green color filter layer 27G1 at the border area BA thereof; in like manner, as will be understood from FIG. 8, the second red color filter layer 27R2, which has the same red color component as that of the first red color filter layer 27R1 but has lesser color density than that of the first red color filter layer 27R1, is formed in the red-filter pixel area so as to partially overlie the first red color filter layer 27R1 at the border area BA thereof; and in addition, the second blue color filter layer 27B2, which has the same blue color component as that of the first blue color filter layer 27B1 but has lesser color density than that of the first blue color filter layer 27B1, is formed in the blue-filter pixel area so as to partially overlie the first blue color filter layer 27B1 at the border area BA thereof. After the formation of these color filter layers 27R1, 27G1, 27B1, 27R2, 27G2, and 27B2, the planarizing film 28 is formed thereon for smoothing the surfaces thereof. The alignment film 31 is formed on the surface of the planarizing film 28. The phase difference layer 29 is formed at a region corresponding to the reflective area RA on the alignment film 31. Another alignment film 32 is formed on the surface of the phase difference layer 29 and the surface of the alignment film 31. The color filter substrate CF3 of the FFS transflective liquid crystal display panel 10D according to the fourth exemplary embodiment of the invention has the structure explained above. After the formation of various layers and components described above, the array substrate AR and the color filter substrate CF3 are provided opposite to each other. More specifically, as done in the production process of the FFS transflective liquid crystal display panel 10A according to the foregoing first exemplary embodiment of the invention, the array substrate AR and the color filter substrate CF3 are set opposite to each other in such a manner that the upper electrode 21 of the array substrate AR faces the color filter layers 27R1, 27G1, 27B1, 27R2, 27G2, and 27B2 of the color filter substrate CF3 with a certain space left therebetween. Then, liquid crystal is injected into the space. Accordingly, the liquid crystal is sealed between the array substrate AR and the color filter substrate CF3. In this way, the FFS transflective liquid crystal display panel 10D according to the fourth exemplary embodiment of the invention is produced.

As explained above, in the configuration of the FFS transflective liquid crystal display panel 10D according to the fourth exemplary embodiment of the invention, a pair of color filter layers (27R1 and 27R2, 27G1 and 27G2, 27B1 and 27B2) one of which has the same color component as that of the other but has color density different from that of the other is formed in the corresponding pixel area in such a manner that the lesser-color-density color filter layer thereof partially overlies the greater-color-density color filter layer thereof at a region that overlaps, when viewed in plan, the side portion 29a of the phase difference layer 29 (i.e., border area BA). For this reason, the light transmission factor of the overlapping area at which the lesser-color-density filter layer of these two color filter layers overlies the greater-color-density filter layer thereof is substantially reduced. That is, in the configuration of the FFS transflective liquid crystal display panel 10D according to the fourth exemplary embodiment of the invention, which has a pair of color filter layers one of which has the same color component as that of the other but has color density different from that of the other in each pixel area in such a manner that the lesser-color-density color filter layer thereof partially overlies the greater-color-density color filter layer thereof at the border area BA, the overlapping color-filter structure explained above is used as a member that lowers a light transmission factor. The lesser-color-density color filter layer thereof is formed in the reflective area RA and the border area BA. The greater-color-density color filter layer thereof is formed in the transmissive area TA and the border area BA. Since the visibility factor of the border area BA is substantially lowered, almost no light that passes through the side portion 29a of the phase difference layer 29 appears on the display screen. Thus, if the configuration of the FFS transflective liquid crystal display panel 10D according to the fourth exemplary embodiment of the invention is adopted, it is possible to effectively avoid degradation in image display performance, which is attributable to a difficulty in the adjustment of retardation at the tapered side portion 29a of the phase difference layer 29.

The structure of the array substrate AR of the FFS transflective liquid crystal display panel 10A, 10B, 10C, or 10D according to the first, second, third, or fourth exemplary embodiment of the invention is not limited to the exemplary configuration explained above. In the following description, a variation example of the FFS transflective liquid crystal display panel 10A, 10B, 10C, or 10D according to the first, second, third, or fourth exemplary embodiment of the invention, which has a modified structure of the array substrate AR, is explained with reference to FIG. 10. The layer structure of a modified FFS transflective liquid crystal display panel shown in FIG. 10 corresponds to the layer structure of the FFS transflective liquid crystal display panel 10A shown in FIG. 2 for the purpose of illustration only, that is, without any intention to limit the scope of the variation thereof. Note that the variation example described below can be applied to any of the FFS transflective liquid crystal display panel 10A, 10B, 10C, and 10D according to the first, second, third, and fourth exemplary embodiments of the invention. For this reason, the border structure between the transmissive area TA of the pixel area and the reflective area RA thereof is not specifically shown in FIG. 10. In addition, in the following description of the modified FFS transflective liquid crystal display panel, the same reference numerals are consistently used for the same components as those of the FFS transflective liquid crystal display panel 10A, 10B, 10C, or 10D according to the first, second, third, or fourth exemplary embodiment of the invention so as to omit, if appropriate, any redundant explanation or simplify explanation thereof.

An FFS transflective liquid crystal display panel 10E according to a variation example of any of the first, second, third, and fourth exemplary embodiments of the invention has a modified array substrate AR1. As a base substrate substance thereof, the array substrate AR1 has the transparent substrate 11, which is made of a transparent material such as glass, though not limited thereto. As shown in FIG. 10, the plurality of scanning lines 12 is formed as a layer component of the array substrate AR1 on the surface of the transparent substrate 11. The plurality of scanning lines 12 extends in parallel with one another. The plurality of common lines 13 is formed on the transparent substrate 11 of the array substrate AR1. Each of these common lines 13 extends along the corresponding one of the scanning lines 12. The gate insulation film 15 is formed over the entire surface of the transparent substrate 11 on which the scanning line 12 and the common line 13 are formed. The semiconductor layer 16 such as an a-Si semiconductor film is formed at a TFT formation area on the surface of the gate insulation film 15. A regional part of the scanning line 12 over which the semiconductor layer 16 is formed when viewed in plan functions as the gate electrode of the TFT.

The signal line 17 is formed on the surface of the gate insulation film 15. A part of the signal line 17 is formed as a source electrode S. In addition to the source electrode S, a drain electrode D is formed on the surface of the gate insulation film 15. The source electrode portion S of the signal line 17 partially overlies the surface of the semiconductor layer 16. The drain electrode D also partially overlies the surface of the semiconductor layer 16. The protective insulation film (i.e., passivation film) 18 is formed on the gate insulation film 15 over the entire surface of the transparent substrate 11. An inter-bedded film (i.e., interlayer film) 33 that is made of a transparent insulation material is formed on the protective insulation film 18. The inter-bedded film 33 has surface roughness in the reflective area RA of each pixel. The surface of the inter-bedded film 33 is smooth for other area, including the transmissive area TA thereof. The uneven surface of the inter-bedded film 33 in the reflective area RA thereof is not shown in the drawing.

A contact hole 39 is formed through the inter-bedded film 33, the protective insulation film 18, and the gate insulation film 15. The contact hole 39 exposes a portion of the common line 13 at the open bottom thereof. The reflecting plate R is formed in the reflective area RA of each pixel area on the surface of the inter-bedded film 33. The lower electrode 14 is formed on the surface of the reflecting plate R and on the surface of the inter-bedded film 33 for each pixel area. The lower electrode 14 is electrically connected to the common line 13 through the contact hole 39. Therefore, the lower electrode 14 functions as a common electrode. The contact hole 19 is formed through the inter-bedded film 33 and the protective insulation film 18 so as to expose the surface of the drain electrode D of the TFT.

A capacitor insulation film 34 is formed on the surface of the lower electrode 14 and on/over the surface of the inter-bedded film 33. The capacitor insulation film 34 is made of a transparent insulation material such as silicon nitride or silicon oxide. The capacitor insulation film 34 covers the inner-wall surface of the contact hole 19 in such a manner that the drain electrode D of the TFT is exposed at the open bottom of the contact hole 19. The capacitor insulation film 34 is formed so as to adjust the distance between the lower electrode 14 and the upper electrode 21. The upper electrode 21 is formed on the capacitor insulation film 34. The upper electrode 21 has the plurality of slits 20. Since the upper electrode 21 has these slits 20, it has the shape of the teeth of a comb when viewed in plan. The upper electrode 21 is electrically connected to the drain electrode D through the contact hole 19. Therefore, the upper electrode 21 functions as a pixel electrode. The alignment film 35 is formed thereon over the entire surface of the transparent substrate 11. The array substrate AR1 of the FFS transflective liquid crystal display panel 10E according to a variation example of the invention has the layer structure explained above.

Since the inter-bedded film 33 is formed between the protective insulation film 18 and the lower electrode 14 as well as between the protective insulation film 18 and the reflecting plate R as explained above, the modified layer structure of the array substrate AR1 of the FFS transflective liquid crystal display panel 10E makes it possible to enlarge the formation areas of the lower electrode 14 and the upper electrode 21. Therefore, it is possible to make the generation area of an electric field relatively large in comparison with that of, for example, the FFS transflective liquid crystal display panel 10A according to the first exemplary embodiment of the invention. For this reason, the FFS transflective liquid crystal display panel 10E according to a variation example of any of the first, second, third, and fourth exemplary embodiments of the invention makes it possible to achieve bright display with an increased aperture ratio.

In the foregoing description of the configuration of the FFS transflective liquid crystal display panel 10B according to a variation example of any of the first, second, third, and fourth exemplary embodiments of the invention, it is explained that the lower electrode 14 functions as a common electrode whereas the upper electrode 21 functions as a pixel electrode. However, the scope of this variation example of the invention is not limited to such an exemplary configuration. For example, the upper electrode may be electrically connected to the common line 13, whereas the lower electrode 14 may be electrically connected to the drain electrode D of the TFT. If so modified, the upper electrode 21 that is electrically connected to the common line 13 functions as a common electrode whereas the lower electrode 14 that is electrically connected to the drain electrode D functions as a pixel electrode.

In the foregoing description of the configuration of the FFS transflective liquid crystal display panel 10E according to a variation example as well as the FFS transflective liquid crystal display panel 10A, 10B, 10C, or 10D according to the first, second, third, or fourth exemplary embodiment of the invention, it is explained that the reflecting plate R is formed at the array-substrate (AR) side. However, the scope of the invention is not limited to such an exemplary configuration. For example, the reflecting plate R may be formed as a color-filter-side film under the color filter layers corresponding to a plurality of colors. If so modified, a user observes a display image not from the color-filter-substrate (CF) side but from the array-substrate (AR) side.

Fifth Embodiment

In the following description, a transflective liquid crystal display panel according to a fifth exemplary embodiment of the invention is explained with reference to FIGS. 11 and 12. Each of the transflective liquid crystal display panels 10A, 10B, 10C, and 10D according to the foregoing first, second, third, and fourth exemplary embodiments of the invention as well as the modified transflective liquid crystal display panel 10E of a variation example thereof is configured as a horizontal electric-field transflective liquid crystal display panel, a non-limiting example of which is an FFS transflective liquid crystal display panel. In contrast, a transflective liquid crystal display panel according to the fifth exemplary embodiment of the invention described below performs display in a vertical electric-field mode. FIG. 11 is a plan view that schematically illustrates an example of the pixel area of a vertical electric-field transflective liquid crystal display panel according to the fifth exemplary embodiment of the invention. More specifically, FIG. 11 shows three pixels of a vertical electric-field transflective liquid crystal display panel according to the fifth exemplary embodiment of the invention. It should be noted that a color filter substrate thereof is omitted from FIG. 11. FIG. 12 is a set of sectional views that schematically illustrates an example of the layer structure of a vertical electric-field transflective liquid crystal display panel according to the fifth exemplary embodiment of the invention. FIG. 12A is a sectional view taken along the line XIIA-XIIA of FIG. 11. FIG. 12B is a sectional view taken along the line XIIB-XIIB of FIG. 11. In the following description of a vertical electric-field transflective liquid crystal display panel according to the fifth exemplary embodiment of the invention, the same reference numerals are consistently used for the same components as those of the FFS transflective liquid crystal display panel 10A, 10B, 10C, or 10D according to the first, second, third, or fourth exemplary embodiment of the invention so as to omit, if appropriate, any redundant explanation or simplify explanation thereof.

As shown in FIG. 11, a vertical electric field transflective liquid crystal display panel 10F according to the fifth exemplary embodiment of the invention has a plurality of pixel areas that is arrayed in a matrix pattern. The plurality of scanning lines 12 and the plurality of signal lines 17 demarcate the pixel areas. Each of these pixel areas is made up of the transmissive area TA and the reflective area RA. The pixel area has a pixel electrode 81 and a TFT. The pixel electrode 81 extends across the border between the transmissive area TA and the reflective area RA. The TFT has the semiconductor layer 16. The drain electrode D of the TFT is electrically connected to the pixel electrode 81. When viewed in plan, the pixel electrode 81 has two slits (i.e., elongated "cutout" spaces) 81a in the border area BA, which is a region around the borderline between the transmissive area TA and the reflective area RA. The transmissive-area (TA) portion of the pixel electrode 81 is electrically connected to the reflective-area (RA) portion thereof via a narrow border portion 81b thereof, which is formed between these two slits 81a. These two slits 81a are formed for controlling the orientation of liquid crystal molecules in the transmissive area TA and the reflective area RA. A common electrode 82 is formed opposite the pixel electrode 81. The common electrode 82 has a projection 83 and another projection 84. The projection 83 has a substantially circular shape when viewed in plan. The projection 83 is formed, when viewed in plan, substantially at the center of the reflective area $RA_{[H1]}$. On the other hand, the projection 84 has a band-like shape when viewed in plan. The projection 84 extends, when viewed in plan, through the center of the transmissive area TA or at least in the neighborhood thereof. $_{[H2]}$These projections 83 and 84 are formed for the same purpose as that of the slits 81a explained above. That is, the projections 83 and 84 are formed for controlling the orientation of liquid crystal molecules. A more detailed explanation of the orientation control of liquid crystal molecules will be given later. The set of color filter layers 27R, 27G, and 27B, which corresponds to three primary color components of red (R), green (G), and blue (B), is formed on the surface of the transparent substrate 25 of a color filter substrate CF4 (refer to FIG. 12). These color filter layers 27R, 27G, and 27B are arrayed so as to correspond to the pixel areas that are arrayed in a matrix pattern.

As shown in FIG. 12A, the vertical electric-field transflective liquid crystal display panel 10F according to the fifth exemplary embodiment of the invention has an array substrate AR2, the color filter substrate CF4, and a liquid crystal layer 80. The array substrate AR2 has the pixel electrode 81 and the TFT. The color filter substrate CF4 has the common electrode 82 and the color filter 27. The liquid crystal layer 80 is sandwiched between the array substrate AR2 and the color filter substrate CF4.

The array substrate AR2 includes, as non-limiting constituent elements thereof, the scanning line 12 (gate electrode G), the gate insulation film 15, and the semiconductor layer 16. The scanning line 12 is formed on the surface of the transparent substrate 11 of the array substrate AR2. The gate insulation film 15 covers the scanning line 12. The semiconductor layer 16 is formed on the surface of the gate insulation film 15 at a position right above the scanning line 12. The source electrode S is formed to overlie the source side of the semiconductor layer 16, whereas the drain electrode D is formed to overlie the drain side of the semiconductor layer 16. The protective insulation film 18 is formed to cover the source electrode S and the drain electrode D. These components make up the TFT. An inter-bedded film 86 is formed to cover the protective insulation film 18. The inter-bedded film 86 functions as a planarizing film. The pixel electrode 81 is formed on the surface of the inter-bedded film 86. The alignment film (i.e., orientation film) 35 is formed to cover the pixel electrode 81. Each of the gate insulation film 15 and the protective insulation film 18 is an inorganic insulation film that is made of, for example, silicon oxide, though not limited thereto. Each of the gate insulation film 15 and the protective insulation film 18 has light-transmitting property (i.e., light transmissivity). The inter-bedded film 86 is an organic insulation film that is made of, for example, acrylic resin, though not limited thereto. The inter-bedded film 86 also has light-transmitting property.

The liquid-crystal-layer-side surface of the inter-bedded film 86 is formed to be rough in the reflective area RA. A film having light-reflecting property (i.e., light reflectivity), which is made of Al or the like, is formed on the uneven surface of the inter-bedded film 86 in the reflective area RA. The reflective film explained above constitutes a reflecting plate 87. The pixel electrode 81 is made of a transparent electro-conductive material such as ITO or the like. The pixel electrode 81 covers the reflecting plate 87. The pixel electrode 81 is electrically connected to the drain electrode D of the TFT via the contact hole 19, which is formed through the inter-bedded film 86.

The color filter substrate CF4 has the light-shielding layer 26, the color filter layers 27R, 27G, and 27B, and the planarizing film 28. The light-shielding layer 26 is formed on the surface of the transparent substrate 25. The color filter 27 is formed to cover the light-shielding layer 26. The planarizing film 28 is formed on the color filter layers 27R, 27G, and 27B for smoothing the surfaces thereof. The color filter substrate CF4 further has the alignment film 31, the phase difference layer 29, and the common electrode 82. The alignment film 31 is formed on the surface of the planarizing film 28. The phase difference layer 29 is formed at a region corresponding to the reflective area RA on the alignment film 31. The common electrode 82 covers the phase difference layer 29. The common electrode 82 is formed so as to face, at least, the pixel electrode 81. The aforementioned circular projection 83, which controls the orientation of liquid crystal molecules, is formed on the common electrode 82, which covers the phase difference layer 29 in the reflective area RA. As explained above, the circular projection 83 is formed in the reflective area RA. On the other hand, the aforementioned band-like (i.e., elongated) projection 84, which also controls the orientation of liquid crystal molecules, is formed on the common electrode 82 in the transmissive area TA. Another alignment film 32 is formed in such a manner that it covers the surfaces of the dome-shaped projection 83 and the belt-shaped projection 84. The alignment film 32 is formed on the liquid-crystal-layer-side surface of the common electrode 82. Accordingly, the alignment film 32 faces the liquid crystal layer 80.

The liquid crystal layer 80 has a negative dielectric anisotropy. Each of the alignment films 32 and 35, which face the liquid crystal layer 80, is a so-called homeotropic alignment film (i.e., vertical orientation film). Therefore, in a driving-voltage OFF state in which no driving electric potential (i.e., driving voltage) is applied between the pixel electrode 81 and the common electrode 82, which are provided opposite to each other with the liquid crystal layer 80 being sandwiched therebetween, liquid crystal molecules are oriented in a direction perpendicular to the surface of each of the orientation films 32 and 35. That is, under driving-voltage OFF conditions, liquid crystal molecules are vertically aligned. When a driving voltage is applied between the pixel electrode 81 and the common electrode 82, which is a driving-electric-potential ON state, the liquid crystal molecules become tilted in such a manner that they are oriented in a direction intersecting with an electric-field direction. In this way, the amount of light that passes through the liquid crystal layer 80 is controlled for image display. Each of the orientation-controlling projections 83 and 84 functions in such a manner that the liquid crystal molecules, which are vertically aligned under the voltage OFF conditions, become tilted in a predetermined orientation when a driving voltage is applied between the pixel electrode 81 and the common electrode 82, that is, under the voltage ON conditions. Specifically, in the reflective area RA, the liquid crystal molecules become tilted in all directions, that is, in a radial pattern with the circular projection 83 being the center thereof. On the other hand, in the transmissive area TA, the liquid crystal molecules become tilted in directions different from and/or opposite to each other with the elongated projection 84 being the border thereof. For example, in the illustrated structure of FIG. 11, some of the liquid crystal molecules become tilted to the left whereas other thereof become tilted to the right with the belt-like projection 84 being the boundary therebetween.

The polarizing plate 41 is formed on each of two outer surfaces of a liquid crystal cell, which is made up of the color filter substrate CF4 and the array substrate 2 with the liquid crystal layer 80 being sandwiched therebetween. Depending on whether the optical axis of the polarizing plate 41 that is formed on one outer surface of the liquid crystal cell is in the same direction as the optical axis of the polarizing plate 41 that is formed on the other outer surface thereof, or they are substantially orthogonal to each other, the OFF-state display mode of the vertical electric-field transflective liquid crystal display panel 10F according to the fifth exemplary embodiment of the invention is determined, which is either white display (i.e., so-called normally-white mode) or black display (i.e., so-called normally-black mode). The operation scheme of the vertical electric-field transflective liquid crystal display panel 10F according to the fifth exemplary embodiment of the invention explained above is called as a VA (Vertical Alignment) mode, although it is not limited thereto. In the configuration of the vertical electric-field transflective liquid crystal display panel 10F according to the fifth exemplary embodiment of the invention, as in the configuration of each of the horizontal electric-field transflective liquid crystal display panels 10A, 10B, 10C, and 10D according to the foregoing first, second, third, and fourth exemplary embodiments of the invention as well as the modified transflective liquid crystal display panel 10F of a variation example thereof, the thickness L2 of the liquid crystal layer 80 at the reflective area RA is set to be a half of the thickness L1 of the liquid crystal layer 80 at the transmissive area TA. Since the thickness L2 of the liquid crystal layer 80 at the reflective area RA is set to be a half of the thickness L1 of the liquid crystal layer 80 at the transmissive area TA, the distance of a transmissive optical path along which a beam of light travels at the transmissive area TA through the liquid crystal layer 80 is made equal to the distance of a reflective optical path along which a beam of light travels at the reflective area RA through the liquid crystal layer 80. In other words, the film thickness of the phase difference layer 29 is adjusted in such a manner that the relationship between the thickness L1 of the liquid crystal layer 80 at the transmissive area TA and the thickness L2 of the liquid crystal layer 80 at the reflective area RA that is expressed in the following mathematical formula is satisfied: $L2=(\frac{1}{2}) L1$. With the film-thickness adjustment explained above, the retardation for non-external light that passes through the transmissive area TA becomes equal to the retardation for external light that enters the vertical electric-field transflective liquid crystal display panel 10F as an incident light beam and then gets reflected at the reflective area RA. Therefore, regardless of whether the transmissive area TA is used for image display (i.e., transmissive display) or the reflective area RA is used for image display (i.e., reflective display), it is possible to achieve optimum image display.

The light-shielding layer 26 of the color filter substrate CF4 of the vertical electric-field transflective liquid crystal display panel 10F according to the fifth exemplary embodiment of the invention demarcates not only the pixel areas but also the transmissive areas TA and the reflective areas RA. That is, in the configuration of the vertical electric-field transflective liquid crystal display panel 10F according to the fifth exemplary embodiment of the invention, a portion of the light-shielding layer 26 of the color filter substrate CF4 is formed at such a boundary region that substantially divides each pixel area into the transmissive area TA and the reflective area RA.

The phase difference layer 29 of the color filter substrate CF4 is formed in such a manner that each of two side portions 29a and 29b thereof overlaps a region at which the light-shielding layer 26 is formed when viewed in plan. More specifically, one side portion 29a of the phase difference layer 29 is formed in the border area BA, which is a region around the borderline between the transmissive area TA and the reflective area RA. The above-mentioned portion of the light-shielding layer 26 is formed in the border area BA. That is, in the configuration of the vertical electric-field transflective liquid crystal display panel 10F according to the fifth exemplary embodiment of the invention, it is the light-shielding layer 26 that is used as a member that lowers a light transmission factor. When determining the width of the border area BA in which the border-area portion of the light-shielding layer 26 is formed, as in the configuration of each of the horizontal electric-field transflective liquid crystal display panels 10A, 10B, 10C, and 10D according to the foregoing first, second, third, and fourth exemplary embodiments of the invention, it is necessary to take at least the following factors into consideration: the taper angle (i.e., inclination angle) of the side portion 29a of the phase difference layer 29, the positional accuracy in the formation of the phase difference layer 29 on the color filter substrate CF4, and the positional accuracy in the adhesion of the color filter substrate CF4 and the array substrate AR2. The same holds true for the opposite side portion 29b of the phase difference layer 29.

As shown in FIG. 12B, the phase difference layer 29 extends across the plurality of pixel areas at the reflective areas RA thereof. In other words, the phase difference layer 29 extends across the plurality of reflective areas RA in a band-like (e.g., elongated, belt-shaped, or strip-shaped, though not limited thereto) shape. Therefore, the side portions of the phase difference layer 29 do not exist at each region that overlaps, when viewed in plan, the inter-pixel-area portion of the light-shielding layer 26 that is formed between each two pixel areas arrayed adjacent to each other (refer to FIG. 12B). For this reason, the retardation value of this non-side (i.e., inter-pixel) area portion falls within a designed range without any substantial aberration therein. Thus, there occurs no image display failure such as optical leakage or the like thereat.

In the configuration of the vertical electric-field transflective liquid crystal display panel 10F according to the fifth exemplary embodiment of the invention, each of the side portions 29a and 29b of the phase difference layer 29, which extends across the plurality of reflective areas RA of the pixel areas in a band-like shape, is formed to overlap the light-shielding region at which the light-shielding layer 26 is formed when viewed in plan. Therefore, even if there occurs some optical failure such as the leakage of light or the like because of a difficulty in the adjustment of retardation at the tapered side portions 29a and 29b of the phase difference layer 29, that is, even if there is some aberration in retardation because of a difficulty in the adjustment of retardation at the tapered side portions 29a and 29b of the phase difference layer 29, it is not perceived on the display thanks to the presence of the light-shielding layer 26. Thus, the vertical electric-field transflective liquid crystal display panel 10F according to the fifth exemplary embodiment of the invention makes any display unevenness unnoticeable, thereby making it possible to avoid any substantial degradation in image display performance. It should be noted that the configuration of the VA-mode transflective liquid crystal display panel 10F according to the fifth exemplary embodiment of the invention is not limited to the specific example explained above. For example, the orientation of liquid crystal molecules may be controlled not with the use of the circular projection 83 and the elongated projection 84 explained above but with the use of orientation-controlling slits, which are formed along a predetermined directions in the pixel electrode 81 and/or the common electrode 82. As another modification example thereof, a capacitor line may be formed in the same process as the formation of the scanning line 12 on the surface of the transparent substrate 11 of the array substrate AR2. In such a modified configuration, the capacitor line is formed in such a manner that it overlaps a portion of the pixel electrode 81 when viewed in plan. In the foregoing description of the configuration of the vertical electric-field transflective liquid crystal display panel 10F according to the fifth exemplary embodiment of the invention, it is explained that the light-shielding layer 26, a portion of which is formed at a region that overlaps the side portion 29a of the phase difference layer 29 (i.e., border area BA) when viewed in plan, is used as a member that lowers a light transmission factor. However, the scope of this aspect of the invention is not limited to such an exemplary configuration. For example, the blue color filter layer 27B, which has the lowest visibility factor, may be formed as a member that lowers a light transmission factor at a region that overlaps the side portion 29a of the phase difference layer 29 when viewed in plan. As another non-limiting example thereof, the overlapping (i.e., overlying) color-filter structure that is made up of at least two color filter layers that differ in color components from each other or one another may be formed as a member that lowers a light transmission factor at a region that overlaps the side portion 29a of the phase difference layer 29 when viewed in plan. Or, as another non-limiting example thereof, the overlapping color-filter structure that is made up of at least two color filter layers that have the same color component but differ in color density from each other or one another may be formed as a member that lowers a light transmission factor at a region that overlaps the side portion 29a of the phase difference layer 29 when viewed in plan.

Electronic Apparatus

In the following description, an explanation is given of two non-limiting examples of a variety of electronic apparatuses to which a transflective liquid crystal display panel according to any of the foregoing exemplary embodiments of the invention explained above as well as a variation example thereof can be applied while referring to FIG. 13. FIG. 13 is a set of diagrams that schematically illustrates an example of the configuration of an electronic apparatus that is provided with a transflective liquid crystal display panel according to any of the foregoing exemplary embodiments of the invention, including any variation example thereof. More specifically, FIG. 13A schematically illustrates an example of the configuration of a personal computer as a non-limiting example of a variety of electronic apparatuses to which the invention can be applied. FIG. 13B schematically illustrates an example of the configuration of a mobile phone as a non-limiting example of a variety of electronic apparatuses to which the invention can be applied. Each of the horizontal electric-field (e.g., FFS) transflective liquid crystal display panels 10A, 10B, 10C, and 10D according to the foregoing first, second, third, and fourth exemplary embodiments of the invention and the modified horizontal electric-field transflective liquid crystal display panel 10E according to a variation example thereof as well as the vertical electric-field (e.g., VA) transflective liquid crystal display panel 10F according to the fifth exemplary embodiment of the invention can be applied to a variety of electronic apparatuses including but not limited to a personal computer, a mobile phone, and a personal digital assistant (PDA). As illustrated in FIG. 13A, a personal computer 100, which is a non-limiting example of various kinds of electronic apparatuses to which the invention can be applied, is made up of a computer main assembly 101 and a display unit 102. The computer main assembly 101 is provided with a keyboard and the like. The display unit 102 is provided with any of the horizontal electric-field transflective liquid crystal display panels 10A, 10B, 10C, and 10D according to the foregoing first, second, third, and fourth exemplary embodiments of the invention and the modified horizontal electric-field transflective liquid crystal display panel 10E according to a variation example thereof, or is provided with the vertical electric-field transflective liquid crystal display panel 10F according to the fifth exemplary embodiment of the invention. In addition thereto, the display unit 102 is further provided with a backlight illumination device. The backlight illumination device is provided at the back of the transflective liquid crystal display panel 10A-10F. The backlight illumination device illuminates the transflective liquid crystal display panel 10A-10F from behind the panel 10A-10F, that is, from the array-substrate (AR) side thereof. As illustrated in FIG. 13B, a mobile phone 110, which is another non-limiting example of various kinds of electronic apparatuses to which the invention can be applied, is made up of a main assembly 111 and a display unit 112. The main assembly 111 constitutes the main body of the mobile phone 110. The main body 111 has a plurality of input buttons and the like. The display unit 112 is mounted on the main body lll in such a manner that it can hinge. That is, the mobile phone 110 has a folding (i.e., foldable) structure. As in the configuration of the display unit 102 of the personal computer 100 explained above, the display unit 112 of the mobile phone 110 is provided with any of the horizontal electric-field transflective liquid crystal display panels 10A, 10B, 10C, and 10D according to the foregoing first, second, third, and fourth exemplary embodiments of the invention and the modified horizontal electric-field transflective liquid crystal display panel 10E according to a variation example thereof, or is provided with the vertical electric-field transflective liquid crystal display panel 10F according to the fifth exemplary embodiment of the invention. In addition thereto, the display unit 112 is further provided with a backlight illumination device. The backlight illumination device is provided at the back of the transflective liquid crystal display panel 10A-10F. The backlight illumination device illuminates the transflective liquid crystal display panel 10A-10F from behind the panel 10A-10F, that is, from the array-substrate (AR) side thereof. Since the fundamental configuration of each of the personal computer 100 and the mobile phone 110 is known well to a person skilled in the art, a detailed explanation thereof is not given here. Each of the personal computer 100 and the mobile phone 110 explained above is provided with any of the horizontal electric-field transflective liquid crystal display panels 10A, 10B, 10C, and 10D according to the foregoing first, second, third, and fourth exemplary embodiments of the invention and the modified horizontal electric-field transflective liquid crystal display panel 10E according to a variation example thereof, or is provided with the vertical electric-field transflective liquid crystal display panel 1OF according to the fifth exemplary embodiment of the invention, which makes any display unevenness unnoticeable (or hard to be perceived). Having such a configuration, each of the personal computer 100 and the mobile phone 110 can display an image, information, or the like in high quality, which is never affected by any change in luminous intensity that depends on indoor/outdoor use environment,

What is claimed is:

1. A transflective liquid crystal display panel, comprising:
a first substrate that has a plurality of pixel areas, each of the plurality of pixel areas having a transmissive area and a reflective area, the first substrate having:
a protective insulation layer,
an inter-bedded film layer made of a transparent insulation material formed above the protective insulation layer,
a reflecting plate formed above the inter-bedded film layer,
a first electrode,
a capacitor insulation layer formed above at least one of the inter-bedded layer and the first electrode, and
a second electrode formed above the capacitor insulation layer and the first electrode; and
a second substrate that is provided opposite to the first substrate with a liquid crystal layer being sandwiched therebetween, the second substrate having:
a color filter that corresponds to a plurality of color components, the color filter that corresponds to the plurality of color components having such an array pattern that corresponds to the plurality of pixel areas, wherein the color filter includes red, green, and blue color filter layers,
phase difference layer that is formed on the liquid-crystal-layer-side face of the second substrate so as to correspond to the reflective area, and
a first strip of the blue color filter layer foamed on the red color filter layer along a side portion of the phase difference layer in the red-filter pixel area at which the red color filter layer is formed; and
a second strip of the blue color filter layer formed on the green color filter layer along the side portion of the phase difference layer in the pixel area at which the green color filter layer is formed.

2. The transflective liquid crystal display panel according to claim 1, wherein the light-transmission-factor reduction member is, among a plurality of color filter layers that make up the above-mentioned color filter, any color filter layer other than one that transmits a light beam of highest visibility.

3. The transflective liquid crystal display panel according to claim 2, wherein a portion of other color filter layer is formed in the pixel area of the above mentioned one color layer that transmits a light beam of highest visibility, and at a region that overlaps, when viewed in plan, the side portion of the phase difference layer in such a manner that the portion of the above-mentioned other color filter layer overlies the above-mentioned one color filter layer that transmits a light beam of highest visibility.

4. The transflective liquid crystal display panel according to claim 1, wherein the second substrate further has a light shielding layer that demarcates the pixel areas when viewed in plan.

5. The transflective liquid crystal display panel according to claim 1, wherein the color filter is made up of, in each of the plurality of pixel areas, a transmissive-area-side color filter layer that is formed in the transmissive area thereof and a reflective-area-side color filter layer that is formed in the reflective area thereof; the reflective-area-side color filter layer has the same color component as that of the transmissive-area-side color filter layer but has lesser color density than that of the transmissive-area-side color filter layer; and
the light-transmission-factor reduction member is the overlapping structure of the transmissive-area-side color filter layer and the reflective-area-side color filter layer.

6. The transflective liquid crystal display panel according to claim 1, wherein a film thickness of the phase difference layer is adjusted in such a manner that the relationship between a thickness L1 of the liquid crystal layer at the transmissive area and a thickness L2 of the liquid crystal layer at the reflective area satisfies the following mathematical formula:

$$L2=(\tfrac{1}{2})L1.$$

7. The transflective liquid crystal display panel according to claim 1, wherein
the first substrate has, in each of the plurality of pixel areas, the first electrode and the second electrode, each of which is formed across the border between the transmissive area and the reflective area, and
the liquid crystal layer is driven by a horizontal electric field that is generated between the first electrode and the second electrode.

8. An electronic apparatus that is provided with the transflective liquid crystal display panel according to claim 1.

9. The transflective liquid crystal display panel according to claim 1, wherein a planarizing film is formed on the color filter layers for smoothing a surface of the color filter layers.

10. The transflective liquid crystal display panel according to claim 1, wherein the first strip and the second strip of the blue color filter layers are connected to each other.

* * * * *